US012718504B1

(12) United States Patent
Kuppersmith et al.

(10) Patent No.: US 12,718,504 B1
(45) Date of Patent: Aug. 25, 2026

(54) SPATIALLY-AWARE VOICE NOTE SYSTEM FOR AUGMENTED REALITY

(71) Applicant: Snap Inc., Santa Monica, CA (US)

(72) Inventors: Mitchell Kuppersmith, Los Angeles, CA (US); Karen Stolzenberg, Venice, CA (US)

(73) Assignee: SNAP INC., Santa Monica, CA (US)

( * ) Notice: Subject to any disclaimer, the term of this patent is extended or adjusted under 35 U.S.C. 154(b) by 117 days.

(21) Appl. No.: 18/926,876

(22) Filed: Oct. 25, 2024

(51) Int. Cl.

| | |
|---|---|
| ***G06F 3/0484*** | (2022.01) |
| ***G06K 9/00*** | (2022.01) |
| ***G06T 13/40*** | (2011.01) |
| ***G06T 19/00*** | (2011.01) |
| ***G10L 21/003*** | (2013.01) |
| ***H04M 1/72433*** | (2021.01) |

(52) U.S. Cl.
CPC ............ *G06T 19/006* (2013.01); *G06T 13/40* (2013.01); *G10L 21/003* (2013.01); *H04M 1/72433* (2021.01)

(58) Field of Classification Search
CPC ...... H04R 1/22; H04R 2430/01; H04R 25/30; H04R 25/305; H04R 25/70; H04R 29/00; H04R 3/04; H04R 1/08; H04R 1/1091; H04R 2201/107; H04R 2410/03; H04R 3/005; H04R 5/033; G06V 40/166
See application file for complete search history.

(56) References Cited

U.S. PATENT DOCUMENTS

| | | | | |
|---|---|---|---|---|
| 10,304,354 | B1 * | 5/2019 | DuQuette | G09B 7/04 |
| 2017/0053109 | A1 * | 2/2017 | Han | G06F 21/32 |
| 2023/0127090 | A1 | 4/2023 | Eirinberg et al. | |
| 2023/0185397 | A1 * | 6/2023 | Anzures | G06F 3/04845 715/739 |

OTHER PUBLICATIONS

"International Application Serial No. PCT/US2025/052434, International Search Report mailed Jan. 26, 2026", 4 pgs.
"International Application Serial No. PCT/US2025/052434, Written Opinion mailed Jan. 26, 2026", 6 pgs.

(Continued)

*Primary Examiner* — Nan-Ying Yang
(74) *Attorney, Agent, or Firm* — SCHWEGMAN LUNDBERG & WOESSNER, P.A.

(57) ABSTRACT

A system for creating and presenting enhanced voice notes in augmented reality (AR) environments is disclosed. The system enables users to generate personalized voice notes with visual and audio enhancements on mobile devices, and deliver them to recipients wearing AR devices. Voice notes can be customized with AI-generated voice styles, animated visual representations, and spatial audio effects. Recipients experience immersive playback through AR glasses, with voice notes appearing at specified locations or anchored to body parts. The system leverages computer vision, spatial audio processing, and real-time tracking to create context-aware and spatially relevant communications. This approach transforms traditional voice messaging into an engaging, three-dimensional experience that seamlessly integrates with the user's physical environment.

20 Claims, 12 Drawing Sheets

(56) References Cited

OTHER PUBLICATIONS

Lenglet, Martin, "FastLips an End-to-End Audiovisual Text-to-Speech System with Lip Features Prediction for Virtual Avatars", Interspeech, [Online]. Retrieved from the Internet: <https://hal.science/hal-04683663vl/file/lenglet24_interspeech.pdf>, Sep. 1, 2024, 4 pgs.

Zanwei, Zhou, "DialogueNeRF Towards Realistic Avatar Face-to-face Conversation Video Generation", Arxiv.Org, Cornell University Library, 201 Olin Library Cornell University Ithaca, NY 14853, Mar. 15, 2022, 19 pgs.

* cited by examiner

SPATIALLY-AWARE VOICE NOTE SYSTEM FOR AUGMENTED REALITY

TECHNICAL FIELD

The present disclosure relates generally to augmented reality (AR) messaging systems, and more specifically to personalized and spatially-aware voice note communication interfaces for wearable AR devices. This technology encompasses methods and systems for creating, sending, and receiving enhanced voice notes through a combination of AR devices and mobile devices, leveraging computer vision, spatial audio, and three dimensional (3D) rendering technologies. The disclosed technology enables users to generate, style, and interact with voice notes in novel ways, including the use of AI-enhanced voice filters, animated visual representations, and spatially-relevant message placement in the physical world or on the message recipient's body. This field encompasses AR devices, mobile devices, computer vision, gesture recognition, and voice-based messaging systems designed to enhance social media and instant messaging experiences in mixed reality environments.

BACKGROUND

Digital communication has evolved significantly in recent years, moving beyond traditional text-based messaging to incorporate rich media and interactive elements. This progression has been particularly evident in the realm of social media and instant messaging platforms, where users increasingly seek more expressive and engaging ways to connect with one another. Voice messaging, in particular, has gained popularity as a convenient and personal method of asynchronous communication, allowing users to convey tone, emotion, and nuance more effectively than text alone.

Concurrently, the field of augmented reality (AR) has been rapidly advancing, offering new possibilities for blending digital content with the physical world. AR technologies, typically delivered through head-mounted displays, smart glasses, or mobile devices, overlay computer-generated information onto the user's view of their environment. These systems utilize sophisticated hardware and software, including cameras, sensors, and spatial mapping algorithms, to create immersive and interactive experiences that seamlessly integrate virtual elements with real-world surroundings.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number generally refers to the figure number in which that element is first introduced. Some non-limiting examples are illustrated in the figures of the accompanying drawings in which.

DETAILED DESCRIPTION

Figure 1:
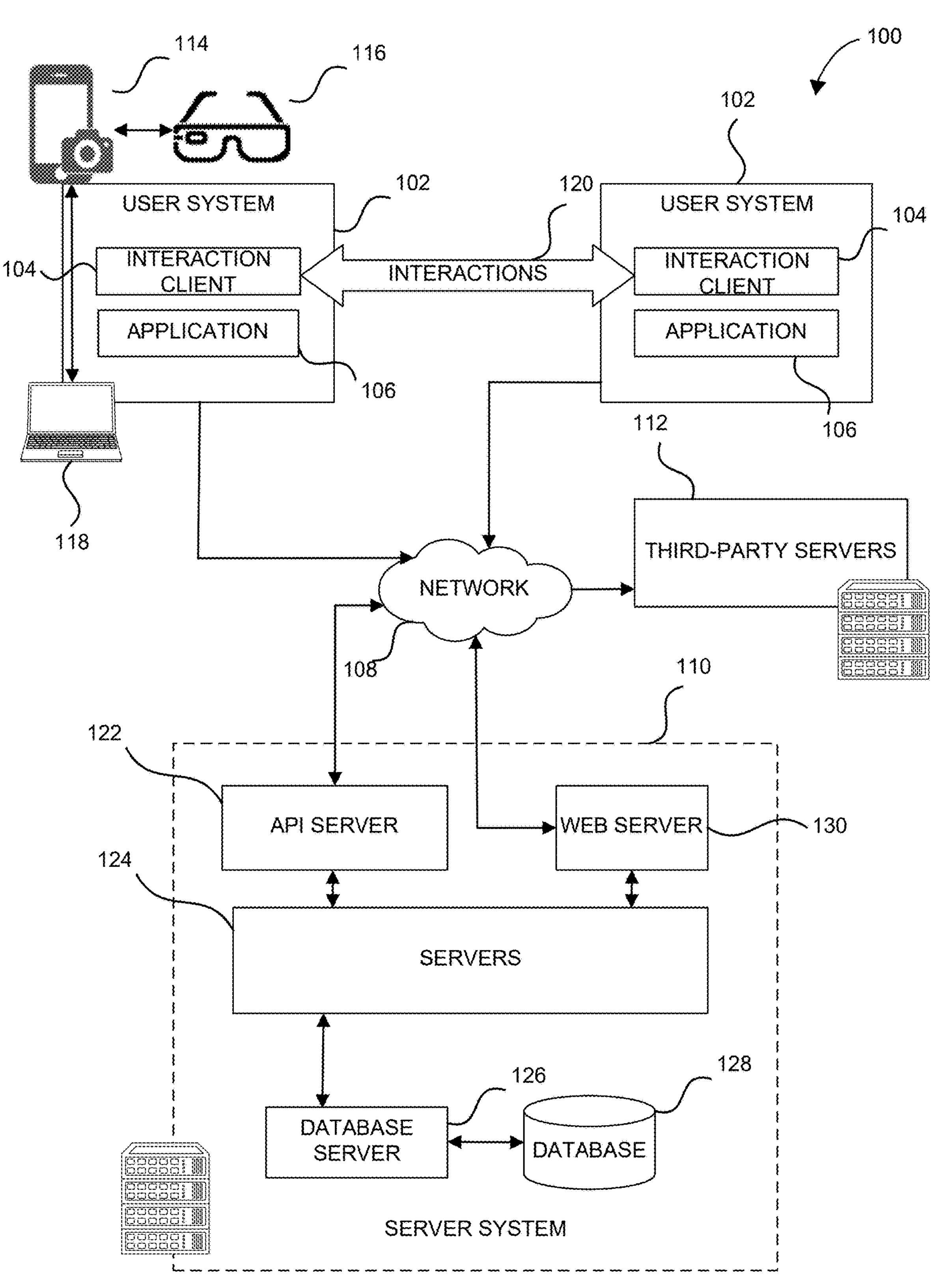
FIG. 1 is a diagrammatic representation of a networked environment in which the innovative techniques set forth herein may be deployed, according to some examples.

The present disclosure describes techniques, including systems and methods, for enhancing voice messaging and social interactions through augmented reality (AR) devices, with a particular focus on personalized and spatially-aware voice note communication interfaces. By leveraging the unique capabilities of AR "smart" glasses and mobile devices, the disclosed techniques create more intuitive, immersive, and personalized user experiences for messaging applications. The following detailed description provides various embodiments of these systems and methods, including AI-enhanced voice filters, animated visual representations, and spatially-relevant message placement in mixed reality environments, and is presented to enable any person skilled in the art to implement and use the disclosed embodiments. For purposes of explanation, specific technical details are set forth to provide a thorough understanding of the present embodiments. However, it will be apparent to one skilled in the art that the present embodiments may be practiced without these specific details.

Current messaging applications face significant technical challenges when adapted for AR environments. Traditional two-dimensional interfaces fail to leverage the full potential of AR devices, resulting in suboptimal user experiences. The technical problem lies in effectively representing and interacting with digital content, such as voice notes or voice messages, in three-dimensional space while maintaining usability and efficiency. Moreover, existing systems lack the capability to seamlessly integrate digital communications with the user's physical body and environment, limiting the contextual relevance and personal nature of interactions.

Additionally, AR devices introduce unique technical constraints, such as the need for hands-free interaction, potential visual clutter, and the challenge of input methods in spatial environments. These constraints further complicate the design and implementation of effective messaging applications in AR. A significant challenge lies in creating intuitive, quick-access interfaces that don't rely on traditional input methods like keyboards or touch screens. The technical challenge extends to developing efficient algorithms for real-time body part detection, tracking, and content anchoring that can operate within the computational limitations of wearable AR devices while ensuring optimal and non-intrusive positioning of digital elements in the user's field of view.

Furthermore, text input, which is used in traditional text messaging, is especially challenging on AR glasses. It's difficult to directly transpose text messaging experiences to AR glasses, as these devices typically don't come with physical keyboards. Virtual, mid-air keyboards for use with hands or controller input are known to be cumbersome, inefficient, and slow to use. They typically have low words-per-minute throughput, resulting in high user frustration, and are not ideal for quick, joyful personal communication like text messaging on a mobile device or a laptop. Thus, voice input presents a compelling opportunity for easier, lower-effort communication for the end user on AR glasses, offering both increased expressiveness and improved efficiency compared to traditional text input methods in AR environments.

To address these technical challenges, the present disclosure proposes techniques, including systems and methods, that leverage the advanced capabilities of AR devices. These approaches utilize computer vision algorithms, voice recognition, spatial audio, and 3D rendering technologies to create immersive, personalized voice note communication interfaces for messaging and social interactions. By reimagining how users interact with voice messages in AR environments, the proposed solutions offer several technical advantages.

One technical advantage is the ability to enhance voice notes with visual elements and AI-generated styles. This is achieved through advanced computer vision techniques for segmenting and cutting out the area around a user's mouth during voice note recording, as well as AI algorithms for voice filtering and style transfer. These enhancements allow for more expressive and engaging voice messages, bridging the gap between text-based and audio communication.

Another technical advantage lies in the development of spatially-aware message placement techniques. By utilizing the AR device's spatial mapping capabilities, voice notes can be anchored to specific real-world locations or parts of the user's body, and/or presented in a location specified in relation to the AR device worn by the recipient. For example, a user can receive a voice note in the palm of their hand or hear a message whispered near their ear using spatial audio. This approach not only maximizes the use of available interaction space in AR environments but also provides users with more contextually relevant and immersive communication experiences.

Furthermore, the proposed systems incorporate advanced input recognition algorithms that can interpret gestures and voice commands, enabling more natural and efficient interactions with voice notes and messaging interfaces. These input methods are complemented by cross-platform functionality, allowing seamless communication between mobile devices and AR spectacles, as well as between multiple AR spectacle users.

By addressing these technical challenges and leveraging the unique capabilities of AR devices, the disclosed systems and methods create messaging applications that offer more immersive, efficient, and personally relevant communication experiences. These solutions not only enhance the functionality of AR devices but also pave the way for new forms of digital interaction that are more closely integrated with users' physical environments and personal relationships. These and other advantages will be readily apparent from the detailed description of the several figures that follows.

Networked Computing Environment

FIG. 1 illustrates a block diagram of an example interaction system 100 designed to facilitate the creation, transmission, and playback of enhanced voice notes or messages in an AR environment. The system 100 comprises multiple user systems 102, each equipped with an interaction client 104 capable of generating and/or playing enhanced voice notes.

The user systems 102 incorporate various devices, including mobile devices 114 and AR device (e.g., "smart" glasses) 116, which, in some instances, may be interconnected to exchange data and messages seamlessly. Mobile devices 114 are specifically outfitted with front-facing cameras and high-quality microphones, for capturing video and audio components required to create immersive enhanced voice notes, which are then presented on AR devices.

As shown in FIG. 1, the interaction client 104 on the mobile device 114 communicates with other interaction clients and the central interaction server system 110 via network 108. This network facilitates the exchange of complex data packages, including various interactions, messages and enhanced voice notes that comprise processed audio, visual representations, and spatial destination information for AR playback.

The interaction server system 110 serves as the back-end system, providing advanced server-side functionality for processing and transmitting enhanced voice notes. However, the distribution of processing tasks between client and server can vary depending on the implementation. In various embodiments, certain aspects of data processing, specifically the application of computer vision models and other machine learning models, may occur on the client side, such as on the mobile device 114 acting as a user system. For example, the mobile device may handle tasks like isolating mouth regions from video feeds using computer vision segmentation algorithms, generating visual representations, and processing audio based on user-selected spatial destinations.

Conversely, in some embodiments, these processing tasks may occur server-side within the interaction server system 110. This flexibility in processing location allows for optimization based on factors such as device capabilities, network conditions, and system load. Regardless of where the processing occurs, the system maintains its capability to create immersive AR experiences by applying sophisticated algorithms and generating compelling visual and audio representations for enhanced voice notes.

Supporting a wide array of services related to enhanced voice notes, the interaction server system 110 manages the intricate processes of transmitting data to AR devices, applying nuanced audio enhancements, and handling spatial positioning information for realistic AR playback scenarios.

The Application Programming Interface (API) server 122 facilitates the seamless creation and transmission of enhanced voice notes between a sender's mobile device 114 and a recipient's AR device (e.g., AR glasses) 116. It handles the packaging and transmission of the enhanced audio, visual representation, and spatial destination information, ensuring a smooth user experience.

Exposing a rich set of functions specific to enhanced voice notes, the API server 122 enables key features such as initiating voice note recording, processing video for precise mouth isolation, applying sophisticated audio enhancements, selecting spatial destinations for AR playback, and transmitting the packaged enhanced voice note to the recipient's AR device.

The interaction servers 124 host a suite of advanced systems dedicated to processing enhanced voice notes. These include state-of-the-art computer vision segmentation algorithms, audio enhancement modules capable of creating spatial audio effects, and specialized spatial audio processing subsystems designed to deliver an immersive AR audio experience.

This comprehensive system enables users to create highly personalized and immersive voice messages or voice notes using their mobile device 114. When recording a voice note, the system captures video of the user's face, isolates the mouth region, for example, as defined by the outer edges of the user's lips, and generates a visual representation of the mouth speaking the message or note. Users can then select a spatial destination for playback in the recipient's AR environment, with the system applying appropriate audio enhancements to reflect this spatial positioning.

The system offers a variety of audio effects to further enhance voice notes. Users can choose from predefined voice filters that modify acoustic properties of the recorded audio, select artificial intelligence (AI) generated voice styles that alter speaking characteristics while maintaining core vocal identity, or apply a voice transfer effect that maps vocal features to match a target voice while preserving content.

For the visual component, users have multiple options. The system allows for versatile visual representations of the voice note, extending beyond just human lips. The tracking data from the actual recording can be mapped to various objects, enabling lip synchronization across a wide range of visual elements. These can include realistic human lips extracted from the video recording, stylized or cartoonish representations of lips, animated animal mouths (such as those of talking animals in cartoons), or even objects that don't naturally have lips but to which lips are added for the purpose of the voice note. This flexibility allows users to choose or create visual representations that best suit their message or personal style.

The system extracts mouth movement data from the isolated mouth region of the original video recording. This data is then applied to animate the chosen visual representation, whether it's a 2D graphic, a 3D model, or any other object selected by the user. For example, if a user chooses a 3D avatar or a cartoon animal, the mouth movements would be synchronized with the enhanced audio of the voice note. Similarly, if a user selects an inanimate object like a talking car, the system could animate a portion of the car (such as the grille or headlights) to mimic lip movements in sync with the audio.

This feature enhances the creative possibilities for users, allowing them to create engaging and potentially humorous voice notes while maintaining the crucial element of lip synchronization for clear communication in the AR environment. The ability to map lip movements to various objects, from realistic human lips to fantastical creatures or even inanimate objects, provides users with a wide range of expressive options, making each voice note a unique and personalized experience.

This innovative communication method leverages machine learning and AR technology to deliver messages that appear to originate from specific locations in the recipient's physical space when played back through AR glasses 116. By offering users a high degree of customization in both audio and visual aspects of their voice notes, the system creates a rich and immersive communication experience that goes beyond traditional messaging.

System Architecture

Figure 2:
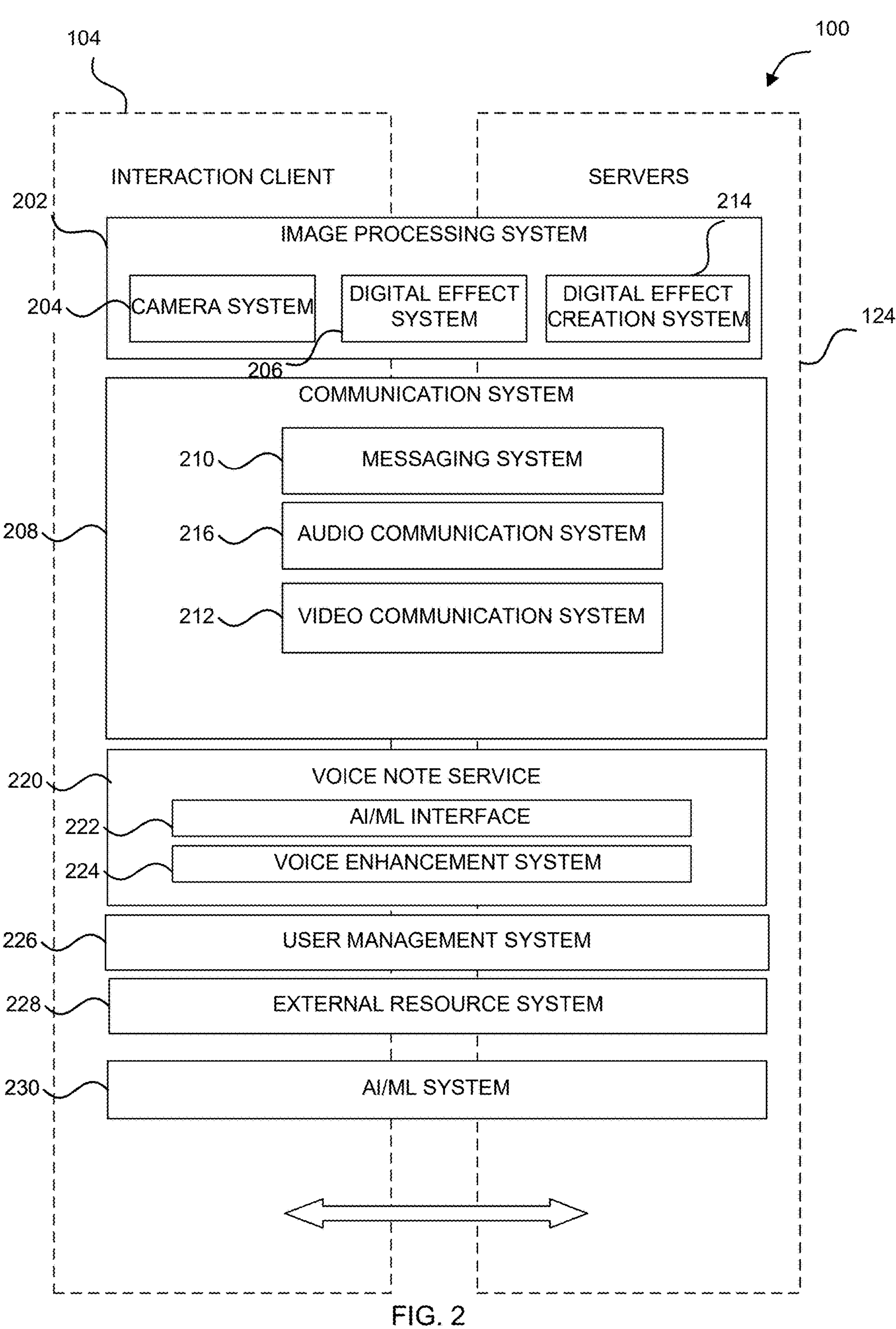
FIG. 2 is a diagrammatic representation of a digital interaction system that has both client-side and server-side functionality, according to some examples.

FIG. 2 illustrates a detailed block diagram of the interaction system 100, focusing on the components of the interaction client 104 and servers 124. The diagram showcases various subsystems that work together to enable the creation, processing, and transmission of enhanced voice notes, among other features.

The interaction client 104 comprises several components, including the image processing system 202, which is responsible for handling visual aspects of the voice note. This system includes the camera system 204 for capturing video of the user's face when recording a voice note, as well as digital effect system 206 and digital effect creation system 214 for applying and creating custom visual effects for voice notes.

The communication system 208 manages communication-related functions, including the messaging system 210 for text-based messaging, audio communication system 216 for processing audio for voice notes and calls, and video communication system 212 for managing video communication and processing.

The voice note service 220 facilitates the creation of voice notes. This service integrates artificial intelligence and machine learning capabilities through the AI/ML interface 222 and applies audio enhancements to the voice notes using the voice enhancement system 224. The voice note service 220 processes audio and video input from the user's device, using various AI and machine learning models to enhance the audio and generate visual representations.

The user management system 226 handles user accounts, preferences, and authentication, while the external resource system 228 interfaces with external services or resources that may be required for voice note creation or processing. The comprehensive AI/ML system 230 provides AI and machine learning capabilities to various components of the interaction client and servers, powering advanced features such as voice style transfer and lip synchronization for animated avatars.

The server system 124 represents the server-side infrastructure that supports the interaction client's functions, handling tasks such as data storage, processing requests from multiple clients, and managing the distribution of enhanced voice notes to recipients. This flexible architecture allows various components of the system to reside and operate on either the client side or the server side, depending on the implementation. This adaptability enables optimization based on factors such as device capabilities, network conditions, and processing requirements.

The interaction between client and server functionalities is designed to be highly flexible. For example, the voice note service 220 can operate on both the client and server sides. On the client side, it can handle immediate processing tasks like recording and basic enhancements. More complex operations that require significant computational resources, such as advanced audio processing, computer vision segmentation, or complex 3D avatar animations, can be offloaded to the server infrastructure as needed. This approach allows for efficient resource utilization and ensures a smooth user experience across various devices and network conditions.

By combining these aspects, the system achieves a balance between local processing on user devices and leveraging server-side capabilities. This architecture supports the creation of highly personalized and immersive voice messages with features like spatial audio positioning, AI-enhanced voice styles, and synchronized visual representations, while dynamically distributing the processing load between client devices and server infrastructure to optimize performance and user experience.

Data Architecture

Figure 3:
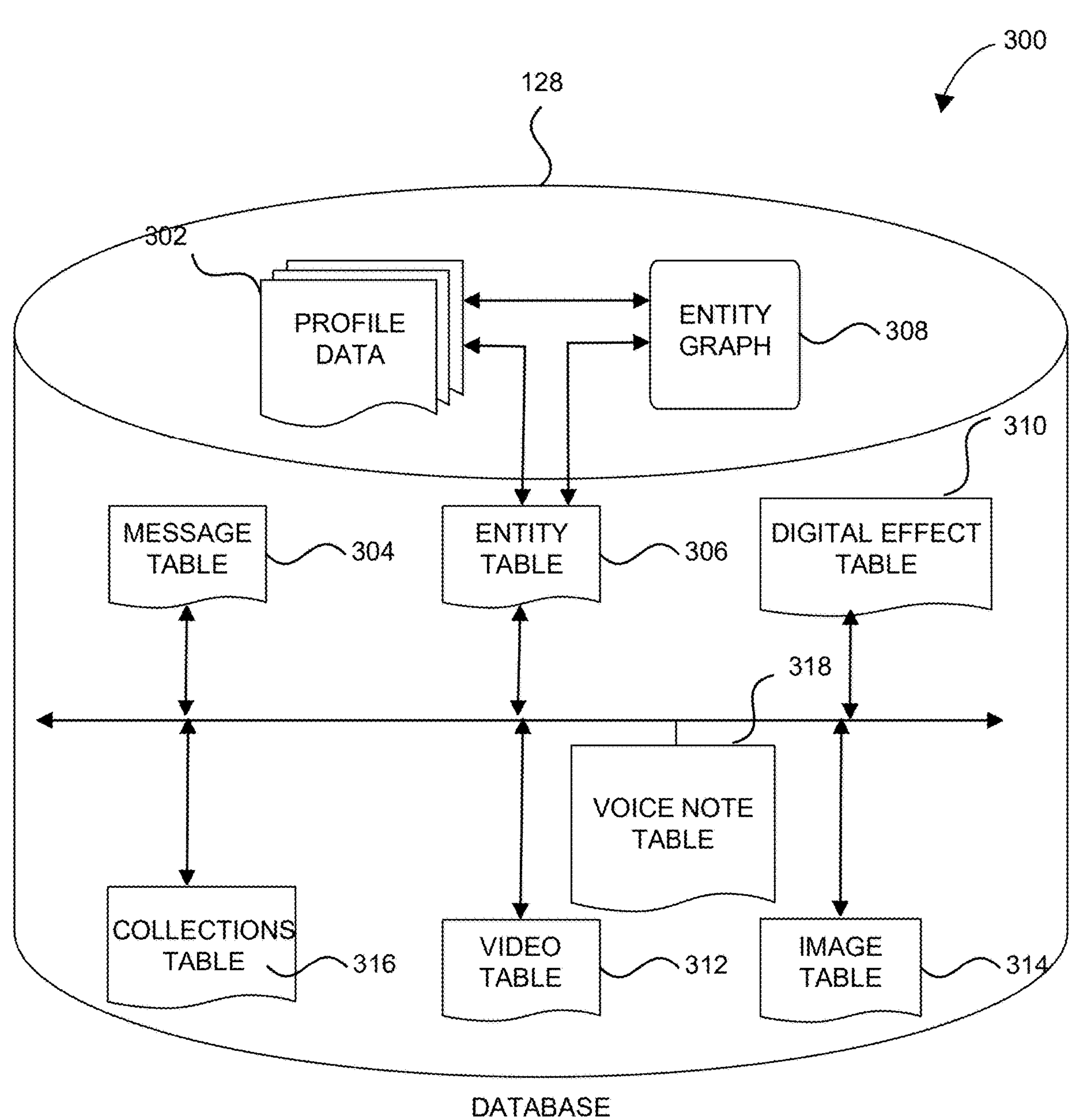
FIG. 3 is a diagrammatic representation of a data structure as maintained in a database, according to some examples.

FIG. 3 is a schematic diagram illustrating data structures 300, which may be stored in the database 128 of the server system 110, according to certain examples. While the content of the database 128 is shown to comprise multiple tables, it will be appreciated that the data could be stored in other types of data structures (e.g., as an object-oriented database).

The database 128 includes several interconnected tables that store various types of data related to the digital interaction system. The message table 304 stores message data, including sender data, recipient data, and payload information. For messages sent through the body-anchored interface, this table may include information about the body part to which the message is to be anchored.

An entity table 306 stores entity data and is linked to an entity graph 308 and profile data 302. Entities can include individuals, organizations, objects, places, and events. For users of the head-wearable apparatus 116, the entity table 306 also stores data related to the user's preferred body-anchored interface settings and configurations.

The entity graph 308 stores information about relationships and associations between entities, which can be social, professional, interest-based, or activity-based. The profile data 302 stores various types of profile information about entities, including privacy settings, avatar representations, and for users of the head-wearable apparatus 116, additional information related to the body-anchored interface.

The database 128 also includes a collections table 316, which stores data about collections of messages and associated media content. Collections can be personal, live, or location-based, offering different ways for users to compile and share content.

A voice note table 318 has been incorporated into the database structure. This table stores data specific to voice notes, which are a key feature of the enhanced communication system. The voice note table 318 includes fields for storing audio data, associated visual representations (such as extracted mouth regions or animated avatars), spatial destination information for AR playback, and any applied audio enhancements or effects. This table is interconnected with other tables such as the message table 304 and the entity table 306, allowing for seamless integration of voice notes into the overall communication system.

The database also includes a video table 312 and an image table 314 for storing video and image data associated with messages. A digital effect table 310 stores various digital effects that can be associated with images and videos, enhancing the visual aspects of the communication system.

This comprehensive database structure supports the advanced features of the digital interaction system, including the newly integrated voice note functionality, enabling rich, context-aware, and spatially-enhanced communications in both traditional and AR environments.

Data Communications Architecture

Figure 4:
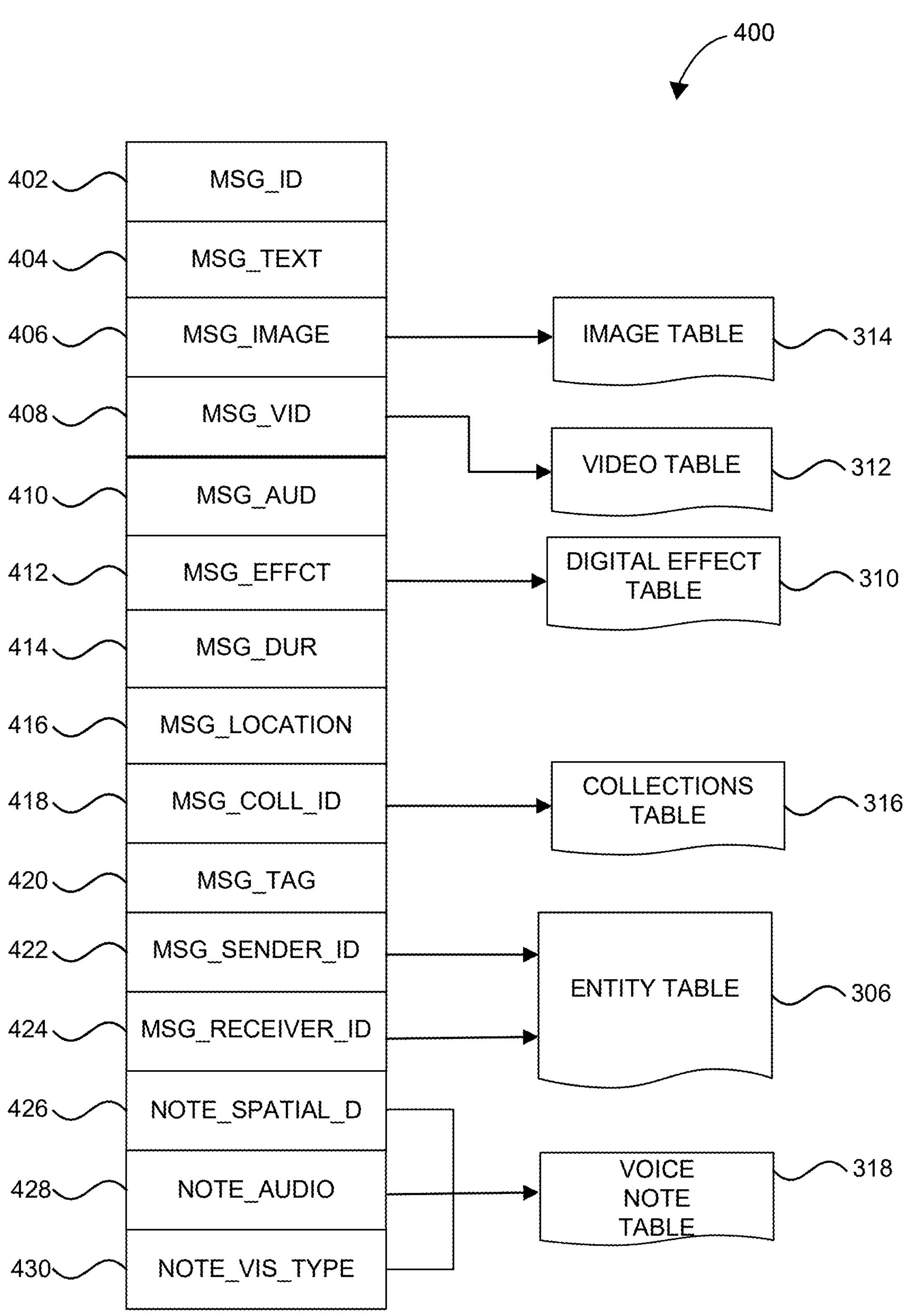
FIG. 4 is a diagrammatic representation of a message structure, according to some examples.

FIG. 4 is a schematic diagram illustrating a structure of a message 400, according to some examples, generated by an interaction client 104 for communication to a further interaction client 104 via the servers 124. The content of a particular message 400 is used to populate the message table 304 stored within the database 128, accessible by the servers 124. Similarly, the content of a message 400 is stored in memory as "in-transit" or "in-flight" data of the user system 102 or the servers 124. A message 400 is shown to include the following example components:

- Message identifier 402: a unique identifier that identifies the message 400.
- Message text payload 404: text, to be generated by a user via a user interface of the user system 102, and that is included in the message 400.
- Message image payload 406: image data, captured by a camera component of a user system 102 or retrieved from a memory component of a user system 102, and that is included in the message 400. Image data for a sent or received message 400 may be stored in the image table 314.
- Message video payload 408: video data, captured by a camera component or retrieved from a memory component of the user system 102, and that is included in the message 400. Video data for a sent or received message 400 may be stored in the video table 312.
- Message audio payload 410: audio data, captured by a microphone or retrieved from a memory component of the user system 102, and that is included in the message 400. For messages sent through the body-anchored interface, this may include voice messages recorded using the head-wearable apparatus 116.
- Message digital effect data 412: digital effect data (e.g., filters, stickers, or other annotations or enhancements) that represents digital effects to be applied to message image payload 406, message video payload 408, or message audio payload 410 of the message 400. Digital effect data for a sent or received message 400 may be stored in the digital effect table 310.
- Message duration parameter 414: parameter value indicating, in seconds, the amount of time for which content of the message (e.g., the message image payload 406, message video payload 408, message audio payload 410) is to be presented or made accessible to a user via the interaction client 104.
- Message geolocation parameter 416: geolocation data (e.g., latitudinal, and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- Message collection identifier 418: identifier values identifying one or more content collections (e.g., "stories" identified in the collections table 316) with which a particular content item in the message image payload 406 of the message 400 is associated. For example, multiple images within the message image payload 406 may each be associated with multiple content collections using identifier values.
- Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

Message reveal location 426: data indicating the specific body part or location where the message or user interface should be displayed or presented when using the body-anchored interface on the head-wearable apparatus 116. This may include coordinates or identifiers for body parts such as the wrist, arm, or hand. For messages sent through the body-anchored interface, values stored within the message reveal location 426 may point to data stored in the body-anchored interface table 318, which contains information about user preferences for interface positioning and spatial context of messages.

Note Spatial Destination 426: This field stores data indicating the specific spatial destination for playing back the enhanced voice note in the recipient's AR environment. It may contain coordinates or predefined positions (e.g., "over_shoulder", "near_ear") to indicate where the audio should appear to originate from during playback. This information is crucial for creating the immersive AR experience described in the invention.

Note Audio Effect 428: This field contains the enhanced audio data of the voice note or a pointer to where this data is stored. It may include the processed audio that reflects any applied enhancements or effects, such as voice filters, AI-generated voice styles, or spatial audio processing.

Note Visual Type 430: This field indicates the type of visual representation chosen for the voice note. It could have values such as "extracted_lips", "2D_graphic", "3D_avatar", or "custom_object". This information is necessary for the system to know how to render the visual component of the voice note in the AR environment.

These specific fields (426, 428, and 430) are linked to the Voice Note Table 318, which stores comprehensive data about each voice note. This structure allows the system to efficiently manage and retrieve all necessary information to recreate the enhanced voice note experience in the recipient's AR environment, including spatial audio positioning, visual representations, and any applied audio enhancements.

The contents (e.g., values) of these various components of message 400 may be pointers to locations in tables within which content data values are stored. For example, values stored within the Note_Spatial_D 426, Note_Audio 428, and Note_Vis_Type 430 fields may point to data stored in the voice note table 318, which contains detailed information about each voice note's characteristics and enhancements.

Spatially-Aware Voice Note Creation

Figure 5:
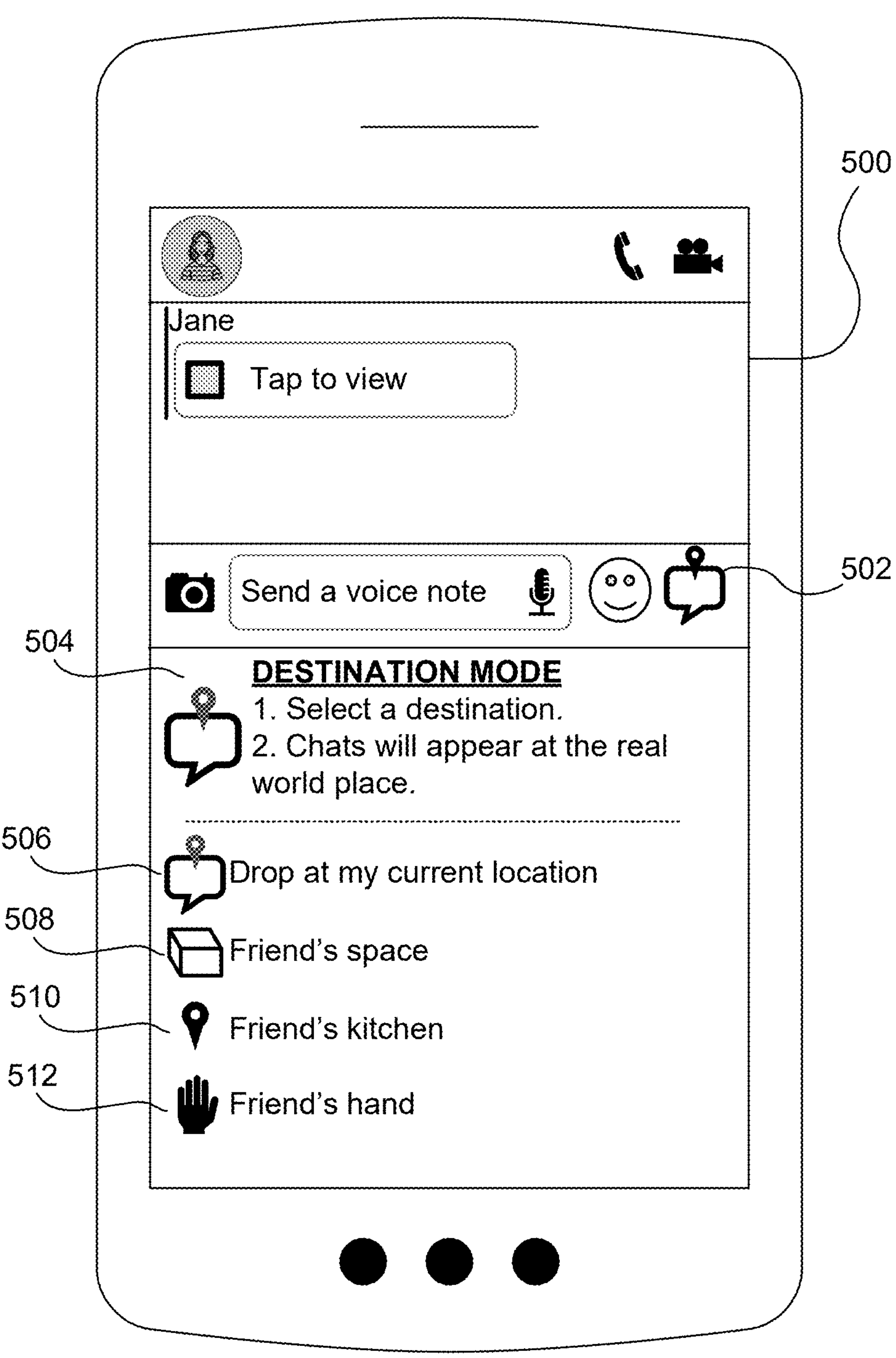
FIG. 5 illustrates a user interface for a mobile device application with destination mode functionality for enhanced voice notes, according to some examples.

FIG. 5 illustrates a user interface 500 for a mobile device application that enables the creation of enhanced voice notes with spatial awareness for augmented reality (AR) environments. This interface allows senders to specify both location information and spatial destination information for voice notes, enhancing the immersive experience for recipients using AR devices.

The interface includes a "Send a voice note" button 502, which initiates the voice note recording process. Below this, a "DESTINATION MODE" section 504 is presented, allowing the sender to select a destination for the voice note. This feature enables the sender to specify where the voice note will appear in the recipient's AR environment.

The interface offers several destination options:

1. "Drop at my current location" 506: This ties the voice note to the sender's current physical location.
2. "Friend's space" 508: This allows the voice note to appear in the recipient's general environment.
3. "Friend's kitchen" 510: This specifies a particular room or area in the recipient's space.
4. "Friend's hand" 512: This designates a body part as the spatial destination for the voice note.

The distinction between location information and spatial destination information is crucial. Location information typically refers to a fixed point in physical space, such as coordinates for a kitchen or living room. Spatial destination information, on the other hand, can be dynamic and relative to the recipient's body or immediate surroundings, such as "Friend's hand" or "over the shoulder".

In some examples, a voice note may incorporate both location and spatial information. For instance, a voice note could be set to appear in the recipient's kitchen (location) and positioned near their right ear (spatial destination). This combination creates a context-aware and personalized AR experience.

However, in other instances, a voice note may be associated with only one type of information. For example, it might be tied solely to a location ("Friend's kitchen") without a specific spatial orientation, or it could have only a spatial destination ("Friend's hand") without a fixed location.

When a sender selects a body part as the spatial destination (e.g., "Friend's hand" 512), the system may present a revised voice note creation flow. This specialized flow acknowledges that body parts serve as dynamic spatial destinations, moving with the recipient. In this case, the AR device, upon receiving a voice note tied to a body part, will use its environmental tracking capabilities to detect and identify the specified body part in real-time.

For example, if a voice note is designated for the recipient's hand, the AR device will continuously track the recipient's hand movements. When the hand is detected within the AR device's field of view, the voice note will be presented, appearing to originate from or be anchored to the hand. This dynamic positioning creates a more interactive and personalized AR experience, as the voice note's presentation adapts to the recipient's movements and position in real-time.

This innovative approach to voice note creation and delivery leverages the unique capabilities of AR devices, creating a more immersive, context-aware, and spatially relevant communication experience.

Figure 6:
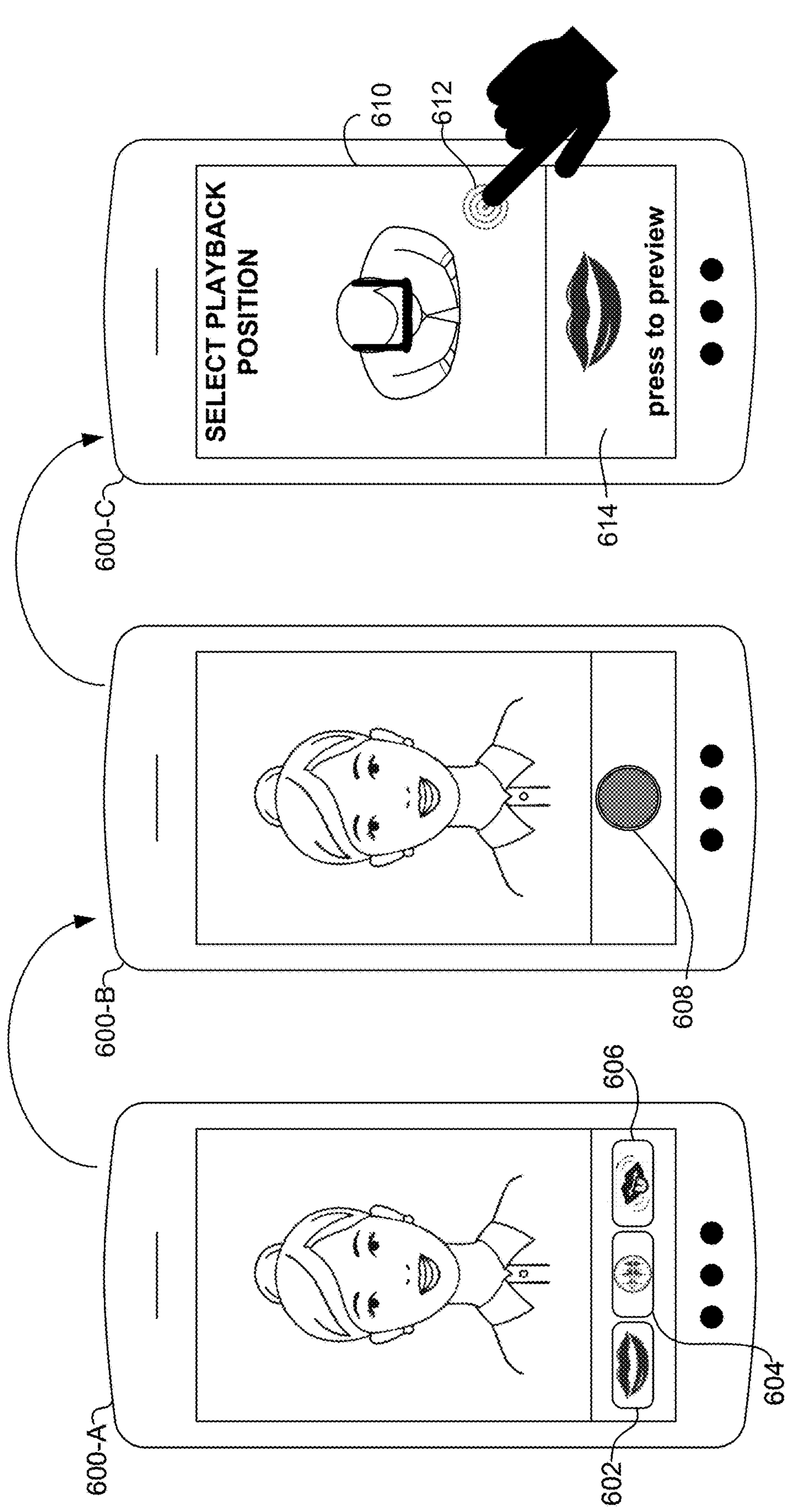
FIG. 6 illustrates a series of user interface screens for recording and previewing an enhanced voice note on a mobile device, according to some examples.

FIG. 6 illustrates a series of user interface screens for recording and previewing an enhanced voice note on a mobile device. The figure shows three screens (600-A, 600-B, and 600-C) that guide the user through the process of creating a spatially-aware voice note with customizable visual and audio elements.

In screen 600-A, the sender can interact with buttons 602, 604, and 606 to select options for the visual representation of the voice note and audio effects. Button 602 allows the user to choose the visual representation, which could include options like extracted lips from the video, animated 2D graphics, or 3D avatars. Button 604 enables the selection of audio effects, such as voice filters, AI-generated voice styles, or voice transfer effects. Button 606 provides options for objects that can be animated using the mouth tracking data, which may include cartoonish animals or inanimate objects with added lip movements.

When a button is selected, additional options may be displayed. For example, selecting button 604 might reveal various audio or voice effects like pitch modulation, reverb, or AI-generated voice styles. Similarly, pressing button 606 could show a range of objects or characters that can be animated with the extracted mouth movement data.

The button 608 in screen 600-B allows the sender to invoke the recording function, capturing both audio and video of the sender speaking the voice note.

Screen 600-C presents an interface 610 that allows the user to select a spatial destination for the voice note in the recipient's AR environment. The user can interact with a visual representation of a person wearing an AR device to choose where the voice note will appear relative to the recipient. The selection position 612 determines how the audio portion of the voice note will be processed.

When the recipient wears the AR device, the speakers in the device will present the audio in a way that makes it sound as if it's originating from the source relative to the AR device, consistent with the position 612 selected by the sender. This spatial audio processing creates various immersive effects. For example, if the sender chooses a position near the recipient's ear, the voice note could sound like a person whispering a secret. Alternatively, selecting a position in front of or behind the recipient could make the voice note sound like someone shouting from that direction.

The preview pane 614 allows the sender to review the enhanced voice note before sending. When the user presses "press to preview," they can experience how the voice note will sound and appear to the recipient.

The processing of the voice note can occur in different ways depending on the implementation. In some embodiments, all processing happens on the client device, utilizing the device's computational resources to apply visual effects, audio enhancements, and spatial audio processing. In other implementations, the raw voice note data (audio, video, and selected parameters) is transmitted to a server for processing. The server then applies the necessary enhancements and sends the processed voice note back to the client device for preview.

This flexible approach allows for optimization based on factors such as device capabilities, network conditions, and the complexity of the requested enhancements. The system can dynamically decide whether to process the voice note locally or leverage server-side resources, ensuring a smooth and efficient user experience regardless of the device's limitations.

In some embodiments, the spatially-aware voice note creation and delivery service may operate between two wearable AR devices (e.g., smart glasses to smart glasses). This expands the functionality beyond the mobile-to-AR device communication initially outlined. The system architecture supports direct communication between AR devices, allowing users of wearable AR devices to create, send, and receive enhanced voice notes within the AR environment.

When operating between two AR devices, the process of creating and sending voice notes remains similar, with some adaptations. However, it's important to note that most AR devices do not have front-facing cameras capable of capturing detailed facial expressions or lip movements. As such, the creation of visual representations for voice notes that require face or lip capture would necessitate the use of a separate device with an appropriate camera facing the user.

This separate device could be a mobile phone, which is commonly used in conjunction with AR glasses. Alternatively, it could be a laptop or desktop computer equipped with a webcam facing the user. The separate device would be responsible for capturing the video feed of the user's face, which is then processed to extract the necessary visual data for the voice note.

The workflow in this scenario would involve the user initiating the voice note creation process on their AR device. The AR device would then signal the paired separate device (e.g., smartphone or computer) to begin recording video. The user would speak their message while looking at the camera of the separate device. Once recording is complete, the video data would be sent to the AR device or directly to a server for processing.

The processing step would involve applying computer vision algorithms to the video feed to isolate the mouth region or capture other relevant facial expressions. This processed visual data would then be combined with the audio recording from the AR device to create the enhanced voice note.

For features that don't require detailed facial capture, such as using predefined animations or stylized avatars, the AR devices can utilize their built-in sensors and cameras to capture user gestures or head movements. These inputs can be used to control simpler visual representations that accompany the voice note.

The AR-to-AR implementation demonstrates the versatility of the technology, allowing for seamless communication between users in various device ecosystems while maintaining the core features of spatial awareness and enhanced voice note experiences. By leveraging additional devices for specific tasks, the system overcomes the limitations of current AR hardware while still providing a rich, immersive communication experience.

Spatially-Aware Voice Note Presentation

Figure 7:
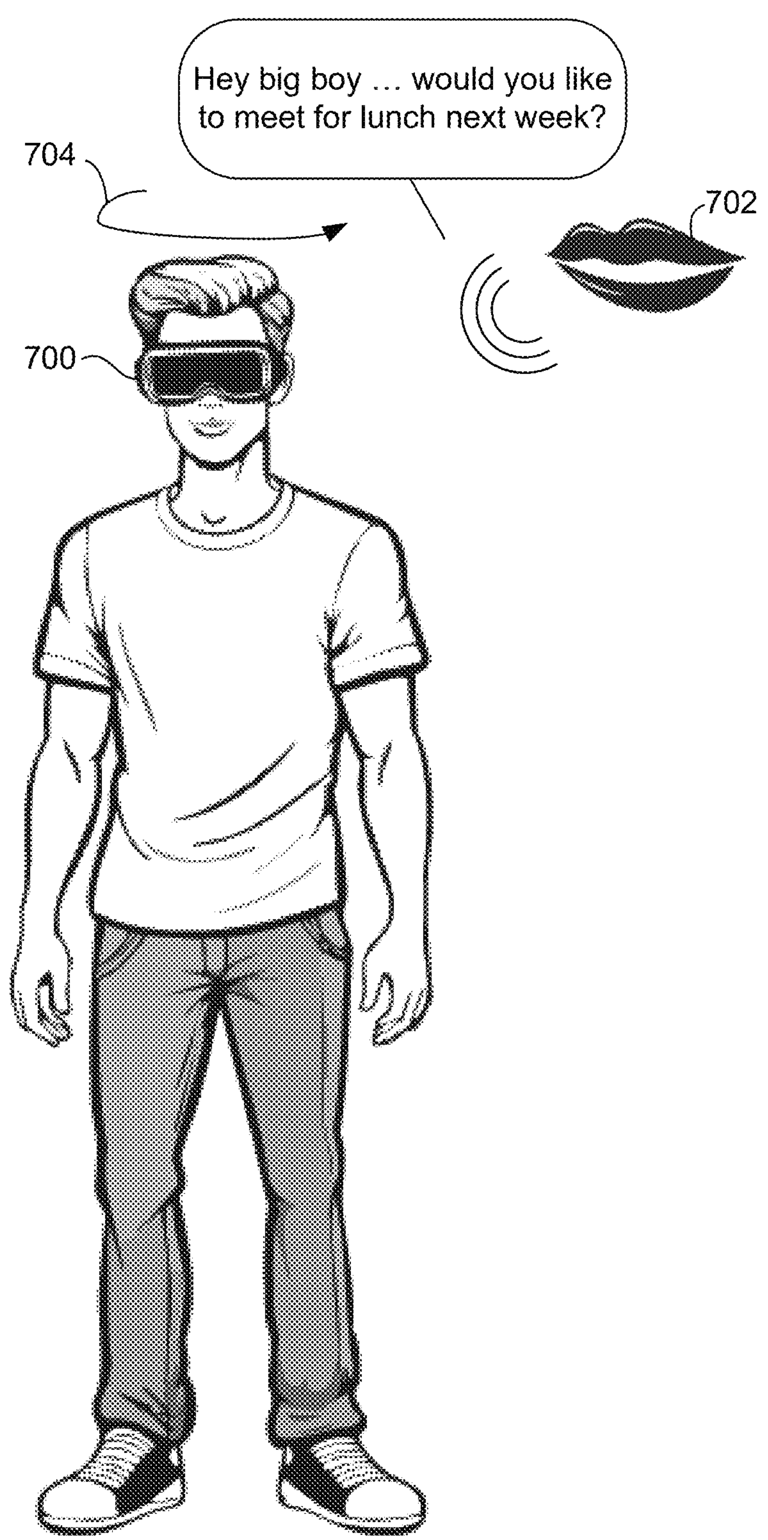
FIG. 7 illustrates a view as seen by a user wearing an augmented reality (AR) device when receiving an enhanced voice note, according to some examples.

FIG. 7 illustrates the experience from the message recipient's perspective, showing a person wearing AR glasses 700. The figure demonstrates how the enhanced voice note is presented in the augmented reality environment.

When a voice note is received, the AR device 700 may project a user interface component or element to provide a notification to the user. This could be a visual indicator in the user's field of view or an audible alert through the AR device's speakers. The user may then invoke playback of the voice note through various means, such as making a hand gesture or speaking an audible command or instruction.

Upon playback, the AR device 700 utilizes spatial audio processing to project the sound as if it is coming from a specific point relative to the user's position and orientation. This is achieved through sophisticated audio processing techniques that manipulate the audio signal to create the illusion of directionality and distance.

The system adjusts parameters such as inter-aural time differences, inter-aural level differences, and spectral cues to simulate how sound would naturally reach the listener's ears from the intended spatial location.

The technical implementation of this spatial audio effect involves several steps:

- Head-related transfer functions (HRTFs) are applied to the audio signal to simulate how sound is filtered by the listener's head, ears, and torso.
- The system continuously tracks the user's head position and orientation using sensors in the AR glasses.
- Real-time adjustments are made to the audio processing based on the user's movements, maintaining the illusion of a fixed sound source in 3D space.
- Reverberation and occlusion effects may be added to enhance realism, based on the virtual environment and the chosen spatial destination for the voice note.

In addition to the spatial audio, the AR device 700 also projects the visual representation of the voice note, in this case, the lips 702, at the location from which the sound appears to originate. This visual element is synchronized with the audio playback, creating a cohesive and immersive experience. In this case, as indicated by the line 704, the user is persuaded to rotate to his left to view the visual presentation, where the audio coming from that direction prompts this rotation by the user, as if to look over his shoulder where the sound is emanating from. This directional audio cue leverages the spatial audio capabilities of the AR device to create a more immersive and interactive experience. The user is naturally guided to turn towards the source of the sound, which enhances the sense of presence and realism in the AR environment. This interaction demonstrates how the system can use audio positioning to influence user behavior and attention, creating a more engaging and dynamic voice note experience that goes beyond traditional static message presentations.

In some embodiments, there may be no visual representation of the actual text content of the message. However, in other implementations, text may be synchronized to the audio message and presented as if it were coming out of the mouth or lips. This text could be generated through speech-to-text processing of the voice note and displayed in real-time as the message plays, enhancing accessibility and comprehension for the recipient.

The combination of spatial audio and synchronized visual elements creates a highly immersive and personalized communication experience in the AR environment. This approach leverages the unique capabilities of AR technology to transform traditional voice messaging into a more engaging and context-aware interaction.

Figure 8:
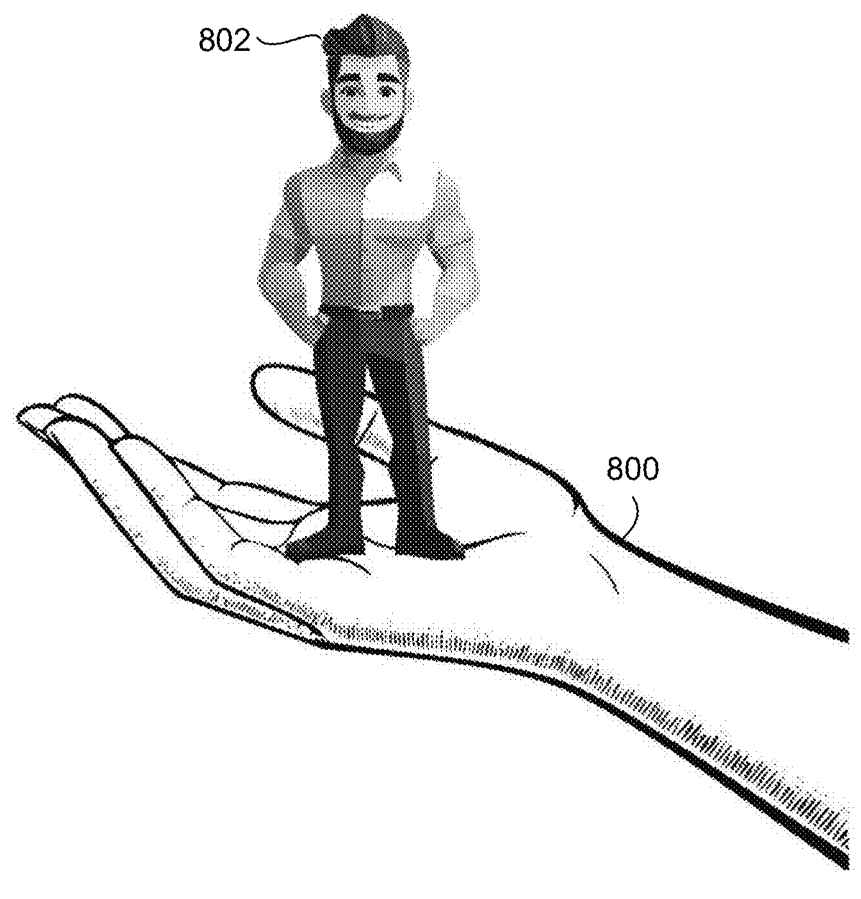
FIG. 8 illustrates an alternative view of an enhanced voice note presentation in an AR environment, according to some examples.

FIG. 8 illustrates an alternative voice note experience where the spatial destination information is a body part, specifically the palm of the hand. This figure demonstrates how the AR device can project a virtual avatar 802 as if it were standing in the user's palm 800.

The AR device utilizes advanced computer vision and spatial mapping technologies to detect and track the user's palm and forearm 800 in real-time. In some examples, this is achieved through a combination of depth sensing cameras, infrared sensors, and machine learning algorithms that can accurately identify and track human body parts in 3D space.

Once the palm is detected, the AR device projects the avatar 802 onto the palm, maintaining its position relative to the hand's movement. This requires continuous tracking and adjustment of the avatar's position and orientation to ensure it appears anchored to the palm, even as the user moves their hand.

The audio portion of the voice message is synchronized with the lip and mouth movements of the avatar 802. This synchronization is achieved through a process that involves the following steps:

- The original voice note audio is analyzed to extract timing information for speech patterns and phonemes.
- This timing data is used to drive the avatar's facial animations, particularly the mouth and lip movements.
- The AR device's processors continuously update the avatar's animations in real-time to maintain synchronization with the audio playback.

The processing for this synchronization can occur on both the client (AR device) and the server, depending on the complexity of the avatar and the available computational resources. For simpler avatars or devices with powerful processors, the synchronization may be handled entirely on the AR device. For more complex avatars or to conserve battery life, some of the processing may be offloaded to a server.

To create the illusion that the sound is emanating from the position of the avatar, even as the user moves and rotates, the AR device employs sophisticated spatial audio processing techniques. These may include:

- Head-related transfer functions (HRTFs) to simulate how sound would naturally reach the user's ears from the avatar's position.
- Real-time adjustments to the audio based on the user's head movements, tracked by the AR device's sensors.
- Dynamic volume and frequency adjustments to simulate distance and direction.
- Use of ray-tracing algorithms to simulate sound reflections and occlusions in the environment.

This spatial audio processing ensures that as the user moves their hand or turns their head, the voice note audio consistently appears to originate from the avatar's location in the palm. The combination of visual tracking, avatar animation, and spatial audio creates a highly immersive and interactive voice note experience that takes full advantage of the AR device's capabilities.

In some embodiments, the system leverages the advanced capabilities of the AR device (e.g., smart glasses) for spatial processing and rendering of enhanced voice notes. This approach allows the mobile device to remain relatively unaware of the specific spatial locations or destinations, while the AR device handles the more complex spatial processing tasks.

The mobile device's role in this configuration is primarily to capture the initial voice note content and allow the user to specify a general spatial destination or context. For example, the mobile user might select "kitchen" or "user's hand" as a destination, without needing to understand the precise spatial coordinates or layout of the recipient's environment.

The AR device, upon receiving the enhanced voice note, employs computer vision (CV) technology and environmental understanding to interpret and render the voice note in the appropriate spatial context. This may involve a dedicated messaging app or system service on the AR device that includes:

- Advanced CV algorithms for real-time environment analysis and object recognition.
- Semantic environmental labeling capabilities to understand and categorize spaces within the user's environment.
- Integration with a large language model (LLM) backend that can process visual information and understand real-world contextual cues.

For example, when a voice note is designated for the "kitchen," the AR device's CV system might recognize specific features such as the shape of a sink, stove, or refrigerator to identify the kitchen area. Alternatively, it could reference a previously mapped and labeled space that has been identified as the "kitchen" in the user's environment.

In cases where the spatial destination is relative to the user's body, such as "near the hand" or "by the head," the AR device utilizes its understanding of hand tracking feature points in six degrees of freedom (6DoF) space. This tracking is complemented by inferences from head tracking and device position data to accurately place the voice note relative to the user's body.

The AR device continuously updates the position of the voice note based on the user's movements and changes in the environment. This ensures that the voice note remains anchored to the intended location or body part, providing a consistent and immersive AR experience.

By offloading the spatial processing to the AR device, this approach allows for greater flexibility and accuracy in voice note placement. It also enables the system to adapt to various environments and user movements without requiring the mobile device to have detailed knowledge of the recipient's spatial context.

Figure 9:
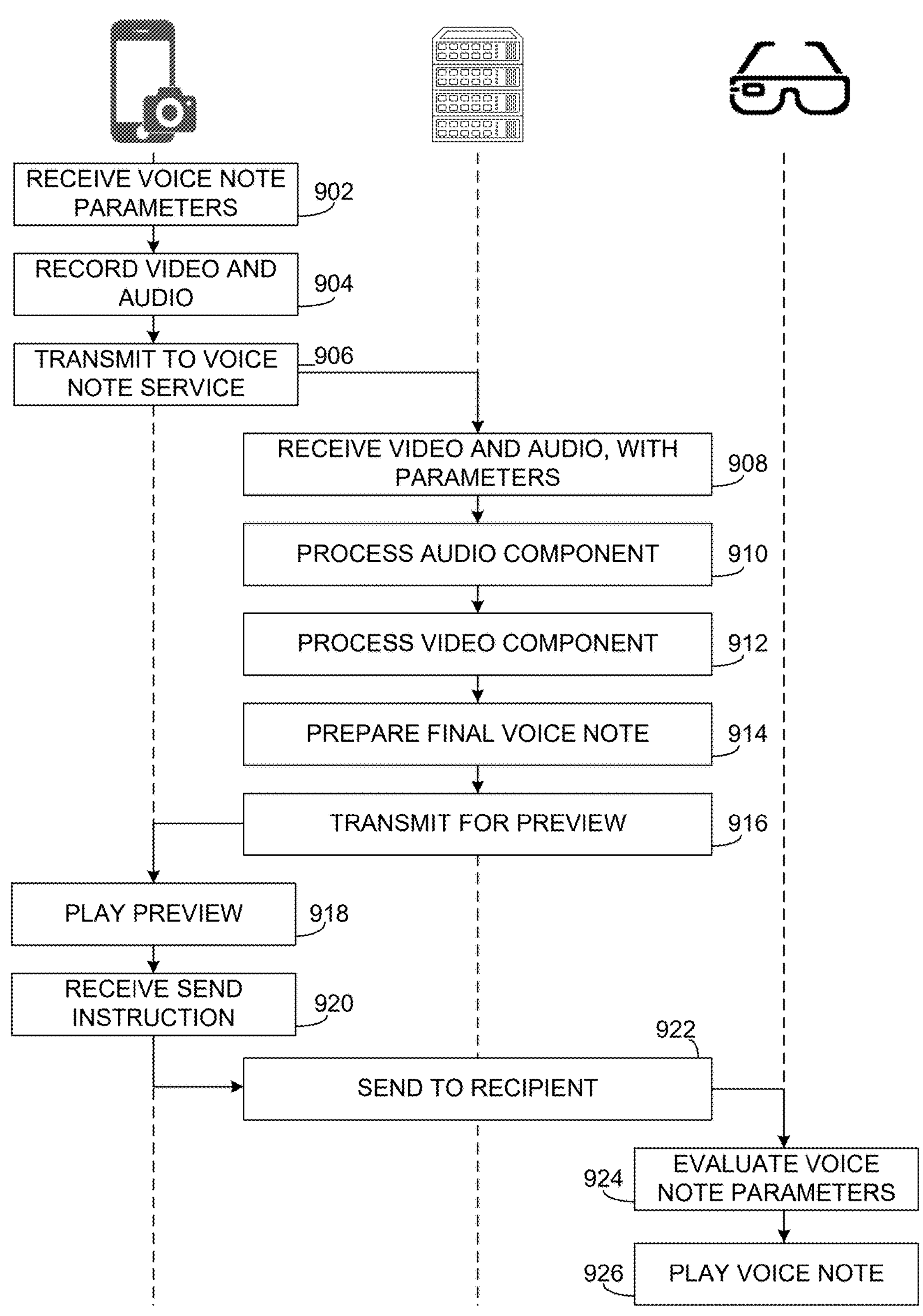
FIG. 9 is a flowchart illustrating a method for creating and transmitting an enhanced voice note, according to some examples.

FIG. 9 illustrates a flowchart depicting a method for creating and transmitting an enhanced voice note, according to some examples. It is important to note that this method is but one example, and in various alternatives, the order in which the several operations occur may vary, and the device at which each operation is performed may also vary. The method provides a detailed technical explanation of the process involved in creating, processing, and delivering enhanced voice notes in an augmented reality (AR) environment.

The method begins at operation 902 with receiving voice note parameters. This operation may occur on a mobile device. The parameters may include user-selected options for visual representation, audio effects, and spatial destination information for the voice note, as well as geolocation information for determining where a voice note should be accessible to a message recipient.

The next step 904 involves recording video and audio. This typically occurs on the sender's device, utilizing the front-facing camera and microphone to capture the user's face and voice simultaneously. The video capture allows for later video analysis and extraction of lip movements and facial expressions.

In some examples, the recorded video and audio, along with the parameters, are transmitted to a voice note service. This service may reside on the device itself or on a remote server, depending on the system's architecture and the complexity of the required processing.

At operation 908, the voice note service receives the video, audio, and parameters. This step may involve data validation and initial preprocessing to ensure the received data is complete and uncorrupted.

Next, at operation 910, the audio component is processed. This may include applying selected voice filters, AI-generated voice styles, or voice transfer effects. Advanced audio processing techniques, such as spatial audio encoding, may be applied based on the selected spatial destination for playback.

The video component is processed at operation 912. This step involves computer vision algorithms to segment and isolate the mouth region from the video. It may also include generating or selecting appropriate visual representations based on user preferences, such as extracted lips, animated avatars, or other graphical elements.

The final voice note is prepared at operation 914. This step combines the processed audio and visual components, along with spatial information and any other enhancements, into a cohesive package ready for transmission or preview.

At operation 916, the prepared voice note is transmitted back to the sender's device for preview. This allows the sender to review the enhanced voice note before deciding to send it.

The sender's device plays the preview of the enhanced voice note at operation 918. This may involve rendering the visual representation and playing the processed audio to simulate how it will appear in the AR environment.

At operation 920, the sender's device receives a send instruction from the user, indicating approval to transmit the voice note to the intended recipient.

Upon receiving the send instruction, at operation 922, the voice note is transmitted to the recipient. This may involve sending the enhanced voice note package to a server for delivery or directly to the recipient's device, depending on the system architecture.

At operation 924, the recipient's device (e.g., an AR device) evaluates the voice note parameters. This step involves interpreting the spatial destination information, audio processing requirements, and visual representation data.

Finally, at 926, the recipient's AR device plays the voice note. This involves rendering the visual representation in the specified spatial location relative to the user's environment or body, and playing the processed audio with appropriate spatial audio techniques to create an immersive AR experience.

Throughout this process, the system dynamically adapts to device capabilities and network conditions. For instance, more computationally intensive tasks like complex audio processing or 3D avatar animations may be offloaded to server-side resources if the client device lacks the necessary processing power. This flexible approach ensures a smooth and efficient user experience across various devices and network environments.

System with Head-Wearable Apparatus

Figure 10:
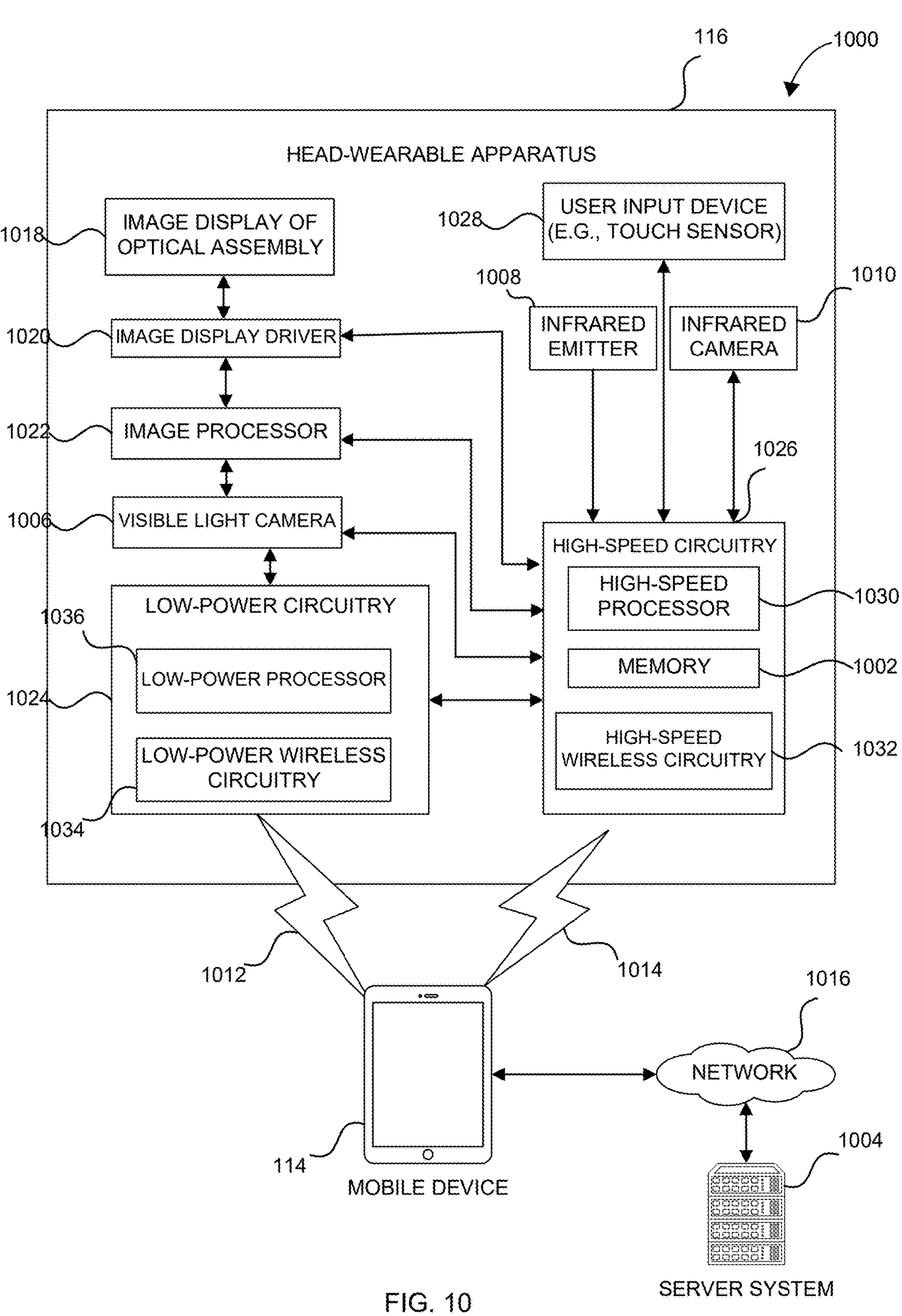
FIG. 10 is a diagrammatic representation of a head-wearable apparatus in communication with a mobile device and server system, according to some examples.

FIG. 10 illustrates a system 1000 including a head-wearable apparatus 116 with a selector input device, according to some examples. FIG. 10 is a high-level functional block diagram of an example head-wearable apparatus 116 communicatively coupled to a mobile device 114 and various server systems 1004 (e.g., the server system 110) via various networks 108.

The head-wearable apparatus 116 includes one or more cameras, each of which may be, for example, a visible light camera 1006, an infrared emitter 1008, and an infrared camera 1010.

The mobile device 114 connects with head-wearable apparatus 116 using both a low-power wireless connection 1012 and a high-speed wireless connection 1014. The mobile device 114 is also connected to the server system 1004 and the network 1016.

The head-wearable apparatus 116 further includes two image displays of the image display of optical assembly 1018. The two image displays of optical assembly 1018 include one associated with the left lateral side and one associated with the right lateral side of the head-wearable apparatus 116. The head-wearable apparatus 116 also includes an image display driver 1020, an image processor 1022, low-power circuitry 1024, and high-speed circuitry 1026. The image display of optical assembly 1018 is for presenting images and videos, including an image that can include a graphical user interface to a user of the head-wearable apparatus 116.

The image display driver 1020 commands and controls the image display of optical assembly 1018. The image display driver 1020 may deliver image data directly to the image display of optical assembly 1018 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1028 (e.g., touch sensor or push button), including an input surface on the head-wearable apparatus 116. The user input device 1028 (e.g., touch sensor or push button) is to receive from the user an input selection to manipulate the graphical user interface of the presented image.

The components shown in FIG. 10 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1006 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1002, which stores instructions to perform a subset, or all the functions described herein. The memory 1002 can also include storage device.

As shown in FIG. 10, the high-speed circuitry 1026 includes a high-speed processor 1030, a memory 1002, and high-speed wireless circuitry 1032. In some examples, the image display driver 1020 is coupled to the high-speed circuitry 1026 and operated by the high-speed processor 1030 to drive the left and right image displays of the image display of optical assembly 1018. The high-speed processor 1030 may be any processor capable of managing high-speed communications and operation of any general computing system needed for the head-wearable apparatus 116. The high-speed processor 1030 includes processing resources needed for managing high-speed data transfers on a high-speed wireless connection 1014 to a wireless local area network (WLAN) using the high-speed wireless circuitry 1032. In certain examples, the high-speed processor 1030 executes an operating system such as a LINUX operating system or other such operating system of the head-wearable apparatus 116, and the operating system is stored in the memory 1002 for execution. In addition to any other responsibilities, the high-speed processor 1030 executing a software architecture for the head-wearable apparatus 116 is used to manage data transfers with high-speed wireless circuitry 1032. In certain examples, the high-speed wireless circuitry 1032 is configured to implement Institute of Electrical and Electronic Engineers (IEEE) 802.11 communication standards, also referred to herein as WI-FI®. In some examples, other high-speed communications standards may be implemented by the high-speed wireless circuitry 1032.

The low-power wireless circuitry 1034 and the high-speed wireless circuitry 1032 of the head-wearable apparatus 116 can include short-range transceivers (e.g., Bluetooth™, Bluetooth LE, Zigbee, ANT+) and wireless wide, local, or wide area network transceivers (e.g., cellular or WI-FI®). Mobile device 114, including the transceivers communicating via the low-power wireless connection 1012 and the high-speed wireless connection 1014, may be implemented using details of the architecture of the head-wearable apparatus 116, as can other elements of the network 1016.

The memory 1002 includes any storage device capable of storing various data and applications, including, among other things, camera data generated by the left and right visible light cameras 1006, the infrared camera 1010, and the image processor 1022, as well as images generated for display by the image display driver 1020 on the image displays of the image display of optical assembly 1018. While the memory 1002 is shown as integrated with high-speed circuitry 1026, in some examples, the memory 1002 may be an independent standalone element of the head-wearable apparatus 116. In certain such examples, electrical routing lines may provide a connection through a chip that includes the high-speed processor 1030 from the image processor 1022 or the low-power processor 1036 to the memory 1002. In some examples, the high-speed processor 1030 may manage addressing of the memory 1002 such that the low-power processor 1036 will boot the high-speed processor 1030 any time that a read or write operation involving memory 1002 is needed.

As shown in FIG. 10, the low-power processor 1036 or high-speed processor 1030 of the head-wearable apparatus 116 can be coupled to the camera (visible light camera 1006, infrared emitter 1008, or infrared camera 1010), the image display driver 1020, the user input device 1028 (e.g., touch sensor or push button), and the memory 1002.

The head-wearable apparatus 116 is connected to a host computer. For example, the head-wearable apparatus 116 is paired with the mobile device 114 via the high-speed wireless connection 1014 or connected to the server system 1004 via the network 1016. The server system 1004 may be one or more computing devices as part of a service or network computing system, for example, that includes a processor, a memory, and network communication interface to communicate over the network 1016 with the mobile device 114 and the head-wearable apparatus 116.

The mobile device 114 includes a processor and a network communication interface coupled to the processor. The network communication interface allows for communication over the network 1016, low-power wireless connection 1012, or high-speed wireless connection 1014. Mobile device 114 can further store at least portions of the instructions in the memory of the mobile device 114 memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1020. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1004, such as the user input device 1028, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include sensors and display elements integrated with the head-wearable apparatus 116. For example, peripheral device elements may include any I/O components including output components, motion components, position components, or any other such elements described herein.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1012 and high-speed wireless connection 1014 from the mobile device 114 via the low-power wireless circuitry 1034 or high-speed wireless circuitry 1032.

Machine Architecture

Figure 11:
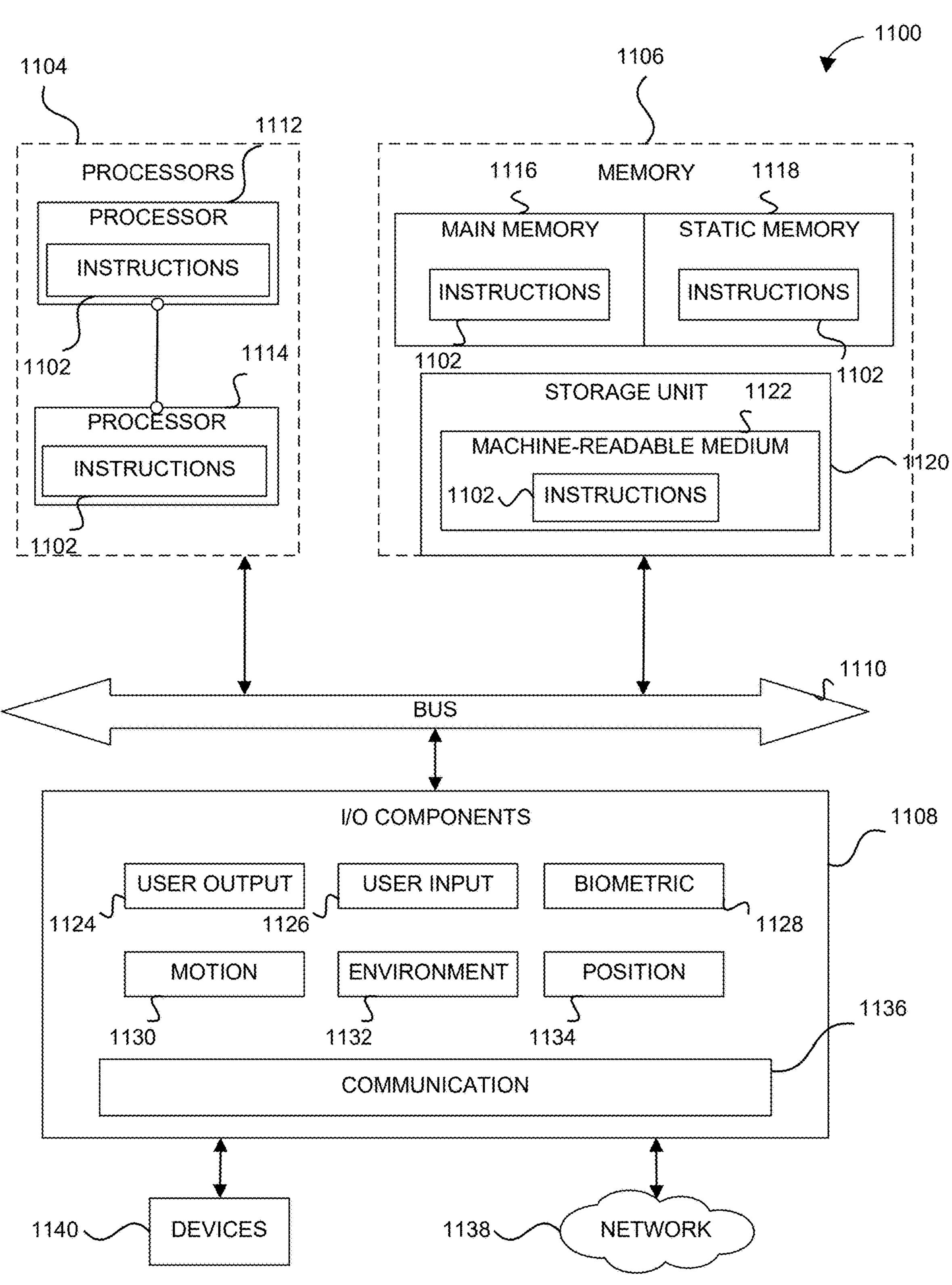
FIG. 11 is a diagrammatic representation of a machine in the form of a computer system within which a set of instructions may be executed to cause the machine to perform any one or more of the methodologies discussed herein, according to some examples.

FIG. 11 is a diagrammatic representation of the machine 1100 within which instructions 1102 (e.g., software, a program, an application, an applet, an app, or other executable code) for causing the machine 1100 to perform any one or more of the methodologies discussed herein may be executed. For example, the instructions 1102 may cause the machine 1100 to execute any one or more of the methods described herein. The instructions 1102 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1102, sequentially or otherwise, that specify actions to be taken by the machine 1100. Further, while a single machine 1100 is illustrated, the term "machine" shall also be taken to include a collection of machines that individually or jointly execute the instructions 1102 to perform any one or more of the methodologies discussed herein. The machine 1100, for example, may comprise the user system 102 or any one of multiple server devices forming part of the server system 110. In some examples, the machine 1100 may also comprise both client and server systems, with certain operations of a particular method or algorithm being performed on the server-side and with certain operations of the method or algorithm being performed on the client-side.

The machine 1100 may include processors 1104, memory 1106, and input/output I/O components 1108, which may be configured to communicate with each other via a bus 1110.

The memory 1106 includes a main memory 1116, a static memory 1118, and a storage unit 1120, both accessible to the processors 1104 via the bus 1110. The main memory 1106, the static memory 1118, and storage unit 1120 store the instructions 1102 embodying any one or more of the methodologies or functions described herein. The instructions 1102 may also reside, completely or partially, within the main memory 1116, within the static memory 1118, within machine-readable medium 1122 within the storage unit 1120, within at least one of the processors 1104 (e.g., within the processor's cache memory), or any suitable combination thereof, during execution thereof by the machine 1100.

The I/O components 1108 may include a wide variety of components to receive input, provide output, produce output, transmit information, exchange information, capture measurements, and so on. The specific I/O components 1108 that are included in a particular machine will depend on the type of machine. For example, portable machines such as mobile phones may include a touch input device or other such input mechanisms, while a headless server machine will likely not include such a touch input device. It will be appreciated that the I/O components 1108 may include many other components that are not shown in FIG. 11. In various examples, the I/O components 1108 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be modified with digital effect data (e.g., filters) described above. The rear cameras may, for example, be used to capture still images and videos in a more traditional camera mode, with these images similarly being modified with digital effect data. In addition to front and rear cameras, the user system 102 may also include a 360° camera for capturing 360° photographs and videos.

Moreover, the camera system of the user system 102 may be equipped with advanced multi-camera configurations. This may include dual rear cameras, which might consist of a primary camera for general photography and a depth-sensing camera for capturing detailed depth information in a scene. This depth information can be used for various purposes, such as creating a bokeh effect in portrait mode, where the subject is in sharp focus while the background is blurred. In addition to dual camera setups, the user system 102 may also feature triple, quad, or even penta camera configurations on both the front and rear sides of the user system 102. These multiple cameras systems may include a wide camera, an ultra-wide camera, a telephoto camera, a macro camera, and a depth sensor, for example.

Communication may be implemented using a wide variety of technologies. The I/O components 1108 further include communication components 1136 operable to couple the machine 1100 to a network 1138 or devices 1140 via respective coupling or connections. For example, the communication components 1136 may include a network interface component or another suitable device to interface with the network 1138. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1140 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1116, static memory 1118, and memory of the processors 1104) and storage unit 1120 may store one or more sets of instructions and data structures (e.g., software) embodying or used by any one or more of the methodologies or functions described herein. These instructions (e.g., the instructions 1102), when executed by processors 1104, cause various operations to implement the disclosed examples.

The instructions 1102 may be transmitted or received over the network 1138, using a transmission medium, via a network interface device (e.g., a network interface component included in the communication components 1136) and using any one of several well-known transfer protocols (e.g., hypertext transfer protocol (HTTP)). Similarly, the instructions 1102 may be transmitted or received using a transmission medium via a coupling (e.g., a peer-to-peer coupling) to the devices 1140.

Software Architecture

Figure 12:
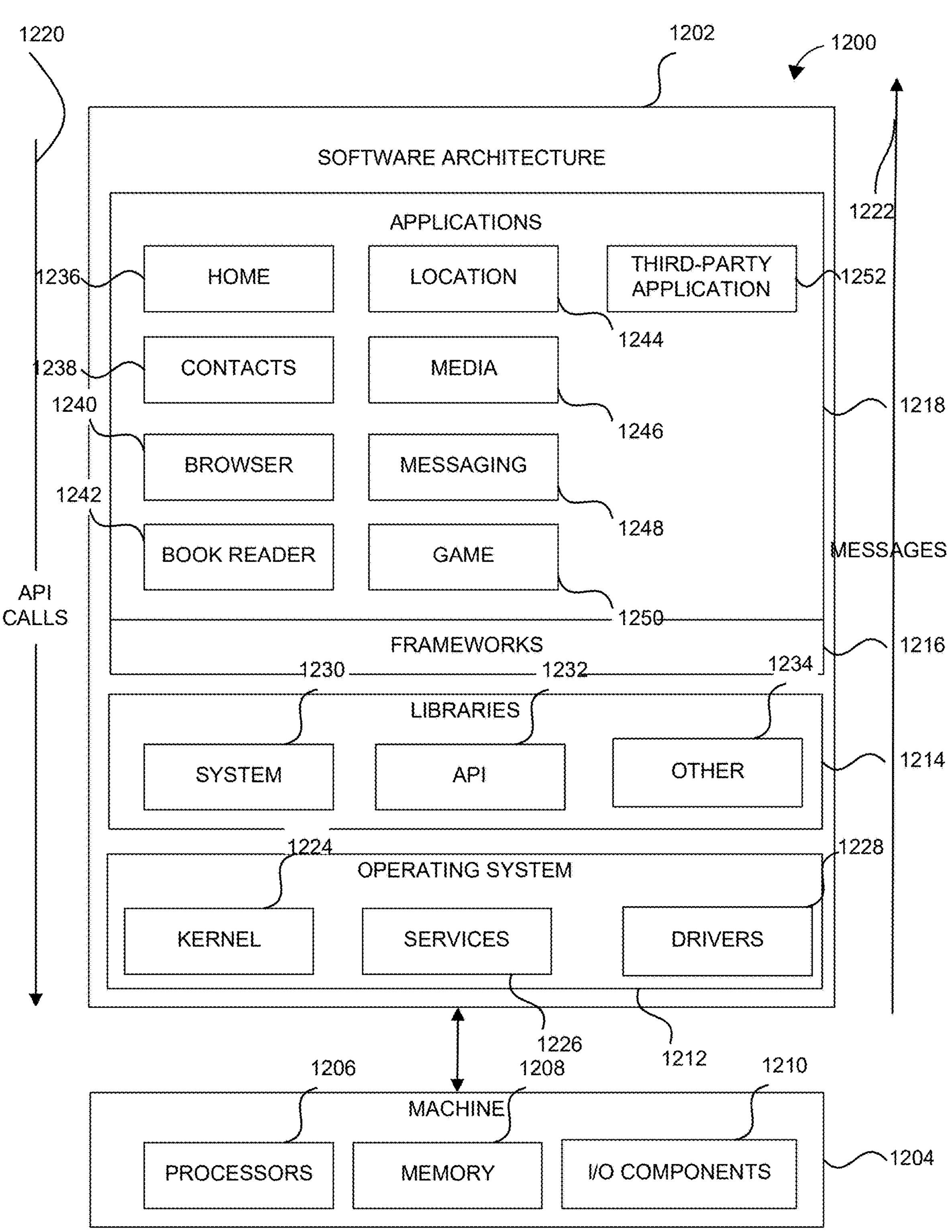
FIG. 12 is a block diagram showing a software architecture within which examples may be implemented.

FIG. 12 is a block diagram 1200 illustrating a software architecture 1202, which can be installed on any one or more of the devices described herein. The software architecture 1202 is supported by hardware such as a machine 1204 that includes processors 1206, memory 1208, and I/O components 1210. In this example, the software architecture 1202 can be conceptualized as a stack of layers, where each layer provides a particular functionality. The software architecture 1202 includes layers such as an operating system 1212, libraries 1214, frameworks 1216, and applications 1218. Operationally, the applications 1218 invoke API calls 1220 through the software stack and receive messages 1222 in response to the API calls 1220.

The operating system 1212 manages hardware resources and provides common services. The operating system 1212 includes, for example, a kernel 1224, services 1226, and drivers 1228. The kernel 1224 acts as an abstraction layer between the hardware and the other software layers. For example, the kernel 1224 provides memory management, processor management (e.g., scheduling), component management, networking, and security settings, among other functionalities. The services 1226 can provide other common services for the other software layers. The drivers 1228 are responsible for controlling or interfacing with the underlying hardware. For instance, the drivers 1228 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1214 provide a common low-level infrastructure used by the applications 1218. The libraries 1214 can include system libraries 1230 (e.g., C standard library) that provide functions such as memory allocation functions, string manipulation functions, mathematical functions, and the like. In addition, the libraries 1214 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1214 can also include a wide variety of other libraries 1234 to provide many other APIs to the applications 1218.

The frameworks 1216 provide a common high-level infrastructure that is used by the applications 1218. For example, the frameworks 1216 provide various graphical user interface (GUI) functions, high-level resource management, and high-level location services. The frameworks 1216 can provide a broad spectrum of other APIs that can be used by the applications 1218, some of which may be specific to a particular operating system or platform.

In an example, the applications 1218 may include a home application 1236, a contacts application 1238, a browser application 1240, a book reader application 1242, a location application 1244, a media application 1246, a messaging application 1248, a game application 1250, and a broad assortment of other applications such as a third-party application 1252. The applications 1218 are programs that execute functions defined in the programs. Various programming languages can be employed to create one or more of the applications 1218, structured in a variety of manners, such as object-oriented programming languages (e.g., Objective-C, Java, or C++) or procedural programming languages (e.g., C or assembly language). In a specific example, the third-party application 1252 (e.g., an application developed using the ANDROID™ or IOS™ software development kit (SDK) by an entity other than the vendor of a platform) may be mobile software running on a mobile operating system such as IOS™, ANDROID™ WINDOWS® Phone, or another mobile operating system. In this example, the third-party application 1252 can invoke the API calls 1220 provided by the operating system 1212 to facilitate functionalities described herein.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to."

As used herein, the terms "connected," "coupled," or any variant thereof means any connection or coupling, either direct or indirect, between two or more elements; the coupling or connection between the elements can be physical, logical, or a combination thereof.

Additionally, the words "herein," "above," "below," and words of similar import, when used in this application, refer to this application as a whole and not to any portions of this application. Where the context permits, words using the singular or plural number may also include the plural or singular number respectively.

The word "or" in reference to a list of two or more items, covers all the following interpretations of the word: any one of the items in the list, all the items in the list, and any combination of the items in the list. Likewise, the term "and/or" in reference to a list of two or more items, covers all the following interpretations of the word: any one of the items in the list, all the items in the list, and any combination of the items in the list.

The various features, operations, or processes described herein may be used independently of one another, or may be combined in various ways. All possible combinations and sub-combinations are intended to fall within the scope of this disclosure. In addition, certain method or process blocks may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

EXAMPLES

Example 1 is a method for creating an enhanced voice note on a mobile device for transmission to an augmented reality (AR) device, the method comprising: receiving, by the mobile device, a user input to initiate recording of a voice note; in response to receiving the user input: activating, by the mobile device, a front-facing camera and at least one microphone to capture video of the face of a user and corresponding audio; processing, by the mobile device, the video by applying a computer vision segmentation process to isolate a region around the mouth of the user; generating, by the mobile device, a visual representation of the voice note by extracting the isolated mouth region from the video; receiving, by the mobile device, a user selection of a spatial destination for playing back the enhanced voice note via the AR device of a message recipient; applying, by the mobile device, one or more enhancements to the recorded audio, wherein at least one of the one or more enhancements comprises processing the audio to reflect the selection of the spatial destination for playback; packaging, by the mobile device, the enhanced audio, the visual representation, and information reflecting the spatial destination to generate the enhanced voice note, wherein the information reflecting the spatial destination is for use in positioning the visual representation of the enhanced voice note in AR space relative to an orientation of the AR device of the message recipient; and transmitting, by the mobile device, the voice note message for communication to the AR device of the message recipient.

In Example 2, the subject matter of Example 1 includes, receiving, by the mobile device, a user selection of a voice filter from a plurality of predefined voice filters; wherein applying, by the mobile device, one or more enhancements to the recorded audio further comprises applying the selected voice filter to the recorded audio, by modifying at least one acoustic property of the recorded audio.

In Example 3, the subject matter of Examples 1-2 includes, receiving, by the mobile device, a user selection of an artificial intelligence (AI) generated voice style from a plurality of predefined AI-generated voice styles; wherein applying, by the mobile device, one or more enhancements to the recorded audio further comprises applying the user-selected AI-generated voice style to the recorded audio by using a deep learning model to modify speaking characteristics of the recorded audio while maintaining core vocal identity.

In Example 4, the subject matter of Examples 1-3 includes, receiving, by the mobile device, a user selection of a target voice for a voice transfer effect; and wherein applying, by the mobile device, one or more enhancements to the recorded audio further comprises applying the voice transfer effect to the recorded audio by using a pre-trained machine learning model to map vocal features of the recorded audio to match vocal qualities of the target voice while preserving content of the voice note.

In Example 5, the subject matter of Examples 1~4 includes, wherein the visual representation of the voice note comprises the isolated mouth region extracted from the video, and wherein transmitting the voice note message includes transmitting the isolated mouth region as a video component to be presented to the message recipient via the AR device.

In Example 6, the subject matter of Examples 1-5 includes, extracting, by the mobile device, mouth movement data from the isolated mouth region; generating, by the mobile device, an animation of a 3D graphic image based on the extracted mouth movement data; and including the generated animation as the visual representation in the voice note message, wherein the animation is synchronized with the enhanced audio for playback on the AR device.

In Example 7, the subject matter of Examples 1-6 includes, extracting, by the mobile device, mouth movement data from the isolated mouth region; applying, by the mobile device, the extracted mouth movement data to animate a mouth of a 3D avatar; and including the animated 3D avatar as the visual representation in the enhanced voice note message, wherein the mouth movements of the 3D avatar are synchronized with the enhanced audio for playback on the AR device.

In Example 8, the subject matter of Examples 1-7 includes, displaying, by the mobile device, a user interface comprising a visual depiction of a person wearing an AR device; receiving, by the mobile device, a user selection of a playback position for the visual representation of the enhanced voice note, wherein the user selection is made by interacting with the visual depiction of the person wearing the AR device; wherein the information reflecting the spatial destination further comprises data indicating the selected playback position; and wherein applying one or more enhancements to the recorded audio comprises processing the audio to create a spatial audio effect based on the selected playback position, such that when played back at the AR device of the message recipient, the audio of the enhanced voice note sounds as if it is coming from the selected playback position.

In Example 9, the subject matter of Examples 1-8 includes, receiving, by the mobile device, a user selection of an object as the spatial destination for the enhanced voice note; wherein packaging the enhanced voice note further comprises including object identification information for the selected object; wherein the information reflecting the spatial destination comprises the object identification information; and wherein the object identification information enables the AR device to present the visual representation of the enhanced voice note anchored to the selected object only after detecting and tracking the selected object in the AR space.

Example 10 is a mobile device to create an enhanced voice note for transmission to an augmented reality (AR) device, the mobile device comprising: a display; at least one camera; at least one microphone; at least one processor; and at least one memory storage device storing instructions thereon, which, when executed by the at least one processor, cause the mobile device to perform operations comprising: receiving a user input to initiate recording of a voice note; in response to receiving the user input: activating a front-facing camera and at least one microphone to capture video of the face of a user and corresponding audio; processing the video by applying a computer vision segmentation process to isolate a region around the mouth of the user; generating a visual representation of the voice note by extracting the isolated mouth region from the video; receiving a user selection of a spatial destination for playing back the enhanced voice note via the AR device of a message recipient; applying one or more enhancements to the recorded audio, wherein at least one of the one or more enhancements comprises processing the audio to reflect the selection of the spatial destination for playback; packaging the enhanced audio, the visual representation, and information reflecting the spatial destination to generate the enhanced voice note, wherein the information reflecting the spatial destination is for use in positioning the visual representation of the enhanced voice note in AR space relative to an orientation of the AR device of the message recipient; and transmitting the voice note message for communication to the AR device of the message recipient.

In Example 11, the subject matter of Example 10 includes, wherein the operations further comprise: receiving a user selection of a voice filter from a plurality of predefined voice filters; wherein applying one or more enhancements to the recorded audio further comprises applying the selected voice filter to the recorded audio, by modifying at least one acoustic property of the recorded audio.

In Example 12, the subject matter of Examples 10-11 includes, wherein the operations further comprise: receiving a user selection of an artificial intelligence (AI) generated voice style from a plurality of predefined AI-generated voice styles; wherein applying one or more enhancements to the recorded audio further comprises applying the user-selected AI-generated voice style to the recorded audio by using a deep learning model to modify speaking characteristics of the recorded audio while maintaining core vocal identity.

In Example 13, the subject matter of Examples 10-12 includes, wherein the operations further comprise: receiving a user selection of a target voice for a voice transfer effect; and wherein applying one or more enhancements to the recorded audio further comprises applying the voice transfer effect to the recorded audio by using a pre-trained machine learning model to map vocal features of the recorded audio to match vocal qualities of the target voice while preserving content of the voice note.

In Example 14, the subject matter of Examples 10-13 includes, wherein the visual representation of the voice note comprises the isolated mouth region extracted from the video, and wherein transmitting the voice note message includes transmitting the isolated mouth region as a video component to be presented to the message recipient via the AR device.

In Example 15, the subject matter of Examples 10-14 includes, wherein the operations further comprise: extracting mouth movement data from the isolated mouth region; generating an animation of a 3D graphic image based on the extracted mouth movement data; and including the generated animation as the visual representation in the voice note message, wherein the animation is synchronized with the enhanced audio for playback on the AR device.

In Example 16, the subject matter of Examples 10-15 includes, wherein the operations further comprise: extracting mouth movement data from the isolated mouth region; applying the extracted mouth movement data to animate a mouth of a 3D avatar; and including the animated 3D avatar as the visual representation in the enhanced voice note message, wherein the mouth movements of the 3D avatar are synchronized with the enhanced audio for playback on the AR device.

In Example 17, the subject matter of Examples 10-16 includes, wherein the operations further comprise: displaying a user interface comprising a visual depiction of a person wearing an AR device; receiving a user selection of a playback position for the visual representation of the enhanced voice note, wherein the user selection is made by interacting with the visual depiction of the person wearing the AR device; wherein the information reflecting the spatial destination further comprises data indicating the selected playback position; and wherein applying one or more enhancements to the recorded audio comprises processing the audio to create a spatial audio effect based on the selected playback position, such that when played back at the AR device of the message recipient, the audio of the enhanced voice note sounds as if it is coming from the selected playback position.

In Example 18, the subject matter of Examples 10-17 includes, wherein the operations further comprise: receiving a user selection of an object as the spatial destination for the enhanced voice note; wherein packaging the enhanced voice note further comprises including object identification information for the selected object; wherein the information reflecting the spatial destination comprises the object identification information; and wherein the object identification information enables the AR device to present the visual representation of the enhanced voice note anchored to the selected object only after detecting and tracking the selected object in the AR space.

Example 19 is a system for creating an enhanced voice note for transmission to an augmented reality (AR) device, the system comprising: means for receiving a user input to initiate recording of a voice note; means for activating a front-facing camera and at least one microphone to capture video of the face of a user and corresponding audio in response to receiving the user input; means for processing the video by applying a computer vision segmentation process to isolate a region around the mouth of the user; means for generating a visual representation of the voice note by extracting the isolated mouth region from the video; means for receiving a user selection of a spatial destination for playing back the enhanced voice note via the AR device of a message recipient; means for applying one or more enhancements to the recorded audio, wherein at least one of the one or more enhancements comprises processing the audio to reflect the selection of the spatial destination for playback; means for packaging the enhanced audio, the visual representation, and information reflecting the spatial destination to generate the enhanced voice note, wherein the information reflecting the spatial destination is for use in positioning the visual representation of the enhanced voice note in AR space relative to an orientation of the AR device of the message recipient; and means for transmitting the voice note message for communication to the AR device of the message recipient.

In Example 20, the subject matter of Example 19 includes, means for displaying a user interface comprising a visual depiction of a person wearing an AR device; means for receiving a user selection of a playback position for the visual representation of the enhanced voice note, wherein the user selection is made by interacting with the visual depiction of the person wearing the AR device; wherein the information reflecting the spatial destination further comprises data indicating the selected playback position; and wherein the means for applying one or more enhancements to the recorded audio comprises means for processing the audio to create a spatial audio effect based on the selected playback position, such that when played back at the AR device of the message recipient, the audio of the enhanced voice note sounds as if it is coming from the selected playback position.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

DEFINITIONS

"Carrier signal" may include, for example, any intangible medium that can store, encoding, or carrying instructions for execution by the machine and includes digital or analog communications signals or other intangible media to facilitate communication of such instructions. Instructions may be transmitted or received over a network using a transmission medium via a network interface device.

"Client device" may include, for example, any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Component" may include, for example, a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" may refer to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" may include, for example, both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" may include, for example, a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media, and device-storage media include non-volatile memory, including by way of example semiconductor memory devices, e.g., erasable programmable read-only memory (EPROM), electrically erasable programmable read-only memory (EEPROM), Field-Programmable Gate Arrays (FPGA), flash memory devices, Solid State Drives (SSD), and Non-Volatile Memory Express (NVMe) devices; magnetic disks such as internal hard disks and removable disks; magneto-optical disks; and CD-ROM, DVD-ROM, Blu-ray Discs, and Ultra HD Blu-ray discs. In addition, machine storage medium may also refer to cloud storage services, network attached storage (NAS), storage area networks (SAN), and object storage devices. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Network" may include, for example, one or more portions of a network that may be an ad hoc network, an intranet, an extranet, a Virtual Private Network (VPN), a Local Area Network (LAN), a Wireless LAN (WLAN), a Wide Area Network (WAN), a Wireless WAN (WWAN), a Metropolitan Area Network (MAN), the Internet, a portion of the Internet, a portion of the Public Switched Telephone Network (PSTN), a Voice over IP (VOIP) network, a cellular telephone network, a 5G™ network, a wireless network, a Wi-Fi® network, a Wi-Fi 6® network, a Li-Fi network, a Zigbee® network, a Bluetooth® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as third Generation Partnership Project (3GPP) including 4G, fifth-generation wireless (5G) networks, Universal Mobile Telecommunications System (UMTS), High Speed Packet Access (HSPA), Long Term Evolution (LTE) standard, others defined by various standard-setting organizations, other long-range protocols, or other data transfer technology.

"Non-transitory computer-readable storage medium" may include, for example, a tangible medium that is capable of storing, encoding, or carrying the instructions for execution by a machine.

"Processor" may include, for example, data processors such as a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), a Quantum Processing Unit (QPU), a Tensor Processing Unit (TPU), a Neural Processing Unit (NPU), a Field Programmable Gate Array (FPGA), another processor, or any suitable combination thereof. The term "processor" may include multi-core processors that may comprise two or more independent processors (sometimes referred to as "cores") that may execute instructions contemporaneously. These cores can be homogeneous (e.g., all cores are identical, as in multicore CPUs) or heterogeneous (e.g., cores are not identical, as in many modern GPUs and some CPUs). In addition, the term "processor" may also encompass systems with a distributed architecture, where multiple processors are interconnected to perform tasks in a coordinated manner. This includes cluster computing, grid computing, and cloud computing infrastructures. Furthermore, the processor may be embedded in a device to control specific functions of that device, such as in an embedded system, or it may be part of a larger system, such as a server in a data center. The processor may also be virtualized in a software-defined infrastructure, where the processor's functions are emulated in software.

"Signal medium" may include, for example, an intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" and "user system" may include, for example, a device or system accessed, controlled or owned by a user and with which the user interacts perform an action, engagement or interaction on the user device or system, including an interaction with other users or computer systems.

What is claimed is:

1. A method for creating an enhanced voice note on a mobile device for transmission to an augmented reality (AR) device, the method comprising:

receiving, by the mobile device, a user input to initiate recording of a voice note;

in response to receiving the user input:

activating, by the mobile device, a front-facing camera and at least one microphone to capture video of the face of a user and corresponding audio;

processing, by the mobile device, the video by applying a computer vision segmentation process to isolate a region around the mouth of the user;

generating, by the mobile device, a visual representation of the voice note by extracting the isolated mouth region from the video;

receiving, by the mobile device, a user selection of a spatial destination for playing back the enhanced voice note via the AR device of a message recipient;

applying, by the mobile device, one or more enhancements to the recorded audio, wherein at least one of the one or more enhancements comprises processing the audio to reflect the selection of the spatial destination for playback;

packaging, by the mobile device, the enhanced audio, the visual representation, and information reflecting the spatial destination to generate the enhanced voice note, wherein the information reflecting the spatial destination is for use in positioning the visual representation of the enhanced voice note in AR space relative to an orientation of the AR device of the message recipient; and transmitting, by the mobile device, the voice note message for communication to the AR device of the message recipient.

2. The method of claim 1, further comprising:

receiving, by the mobile device, a user selection of a voice filter from a plurality of predefined voice filters;

wherein applying, by the mobile device, one or more enhancements to the recorded audio further comprises applying the selected voice filter to the recorded audio, by modifying at least one acoustic property of the recorded audio.

3. The method of claim 1, further comprising:

receiving, by the mobile device, a user selection of an artificial intelligence (AI) generated voice style from a plurality of predefined AI-generated voice styles;

wherein applying, by the mobile device, one or more enhancements to the recorded audio further comprises applying the user-selected AI-generated voice style to the recorded audio by using a deep learning model to modify speaking characteristics of the recorded audio while maintaining core vocal identity.

4. The method of claim 1, further comprising:

receiving, by the mobile device, a user selection of a target voice for a voice transfer effect; and wherein applying, by the mobile device, one or more enhancements to the recorded audio further comprises applying the voice transfer effect to the recorded audio by using a pre-trained machine learning model to map vocal features of the recorded audio to match vocal qualities of the target voice while preserving content of the voice note.

5. The method of claim 1, wherein the visual representation of the voice note comprises the isolated mouth region extracted from the video, and wherein transmitting the voice note message includes transmitting the isolated mouth region as a video component to be presented to the message recipient via the AR device.

6. The method of claim 1, further comprising:

extracting, by the mobile device, mouth movement data from the isolated mouth region;

generating, by the mobile device, an animation of a 3D graphic image based on the extracted mouth movement data; and including the generated animation as the visual representation in the voice note message, wherein the animation is synchronized with the enhanced audio for playback on the AR device.

7. The method of claim 1, further comprising:

extracting, by the mobile device, mouth movement data from the isolated mouth region;

applying, by the mobile device, the extracted mouth movement data to animate a mouth of a 3D avatar; and including the animated 3D avatar as the visual representation in the enhanced voice note message, wherein the mouth movements of the 3D avatar are synchronized with the enhanced audio for playback on the AR device.

8. The method of claim 1, further comprising:

displaying, by the mobile device, a user interface comprising a visual depiction of a person wearing an AR device;

receiving, by the mobile device, a user selection of a playback position for the visual representation of the enhanced voice note, wherein the user selection is made by interacting with the visual depiction of the person wearing the AR device;

wherein the information reflecting the spatial destination further comprises data indicating the selected playback position; and wherein applying one or more enhancements to the recorded audio comprises processing the audio to create a spatial audio effect based on the selected playback position, such that when played back at the AR device of the message recipient, the audio of the enhanced voice note sounds as if it is coming from the selected playback position.

9. The method of claim 1, further comprising:

receiving, by the mobile device, a user selection of an object as the spatial destination for the enhanced voice note;

wherein packaging the enhanced voice note further comprises including object identification information for the selected object;

wherein the information reflecting the spatial destination comprises the object identification information; and wherein the object identification information enables the AR device to present the visual representation of the enhanced voice note anchored to the selected object only after detecting and tracking the selected object in the AR space.

10. A mobile device to create an enhanced voice note for transmission to an augmented reality (AR) device, the mobile device comprising:

a display;

at least one camera;

at least one microphone;

at least one processor; and at least one memory storage device storing instructions thereon, which, when executed by the at least one processor, cause the mobile device to perform operations comprising:

receiving a user input to initiate recording of a voice note;

in response to receiving the user input:

activating a front-facing camera and at least one microphone to capture video of the face of a user and corresponding audio;

processing the video by applying a computer vision segmentation process to isolate a region around the mouth of the user;

generating a visual representation of the voice note by extracting the isolated mouth region from the video;

receiving a user selection of a spatial destination for playing back the enhanced voice note via the AR device of a message recipient;

applying one or more enhancements to the recorded audio, wherein at least one of the one or more enhancements comprises processing the audio to reflect the selection of the spatial destination for playback;

packaging the enhanced audio, the visual representation, and information reflecting the spatial destination to generate the enhanced voice note, wherein the information reflecting the spatial destination is for use in positioning the visual representation of the enhanced voice note in AR space relative to an orientation of the AR device of the message recipient; and transmitting the voice note message for communication to the AR device of the message recipient.

11. The mobile device of claim 10, wherein the operations further comprise:

receiving a user selection of a voice filter from a plurality of predefined voice filters;

wherein applying one or more enhancements to the recorded audio further comprises applying the selected voice filter to the recorded audio, by modifying at least one acoustic property of the recorded audio.

12. The mobile device of claim 10, wherein the operations further comprise: receiving a user selection of an artificial intelligence (AI) generated voice style from a plurality of predefined AI-generated voice styles;

wherein applying one or more enhancements to the recorded audio further comprises applying the user-selected AI-generated voice style to the recorded audio by using a deep learning model to modify speaking characteristics of the recorded audio while maintaining core vocal identity.

13. The mobile device of claim 10, wherein the operations further comprise: receiving a user selection of a target voice for a voice transfer effect; and wherein applying one or more enhancements to the recorded audio further comprises applying the voice transfer effect to the recorded audio by using a pre-trained machine learning model to map vocal features of the recorded audio to match vocal qualities of the target voice while preserving content of the voice note.

14. The mobile device of claim 10, wherein the visual representation of the voice note comprises the isolated mouth region extracted from the video, and wherein transmitting the voice note message includes transmitting the isolated mouth region as a video component to be presented to the message recipient via the AR device.

15. The mobile device of claim 10, wherein the operations further comprise: extracting mouth movement data from the isolated mouth region;

generating an animation of a 3D graphic image based on the extracted mouth movement data; and including the generated animation as the visual representation in the voice note message, wherein the animation is synchronized with the enhanced audio for playback on the AR device.

16. The mobile device of claim 10, wherein the operations further comprise:

extracting mouth movement data from the isolated mouth region; applying the extracted mouth movement data to animate a mouth of a 3D avatar; and including the animated 3D avatar as the visual representation in the enhanced voice note message, wherein the mouth movements of the 3D avatar are synchronized with the enhanced audio for playback on the AR device.

17. The mobile device of claim 10, wherein the operations further comprise:

displaying a user interface comprising a visual depiction of a person wearing an AR device;

receiving a user selection of a playback position for the visual representation of the enhanced voice note, wherein the user selection is made by interacting with the visual depiction of the person wearing the AR device;

wherein the information reflecting the spatial destination further comprises data indicating the selected playback position; and wherein applying one or more enhancements to the recorded audio comprises processing the audio to create a spatial audio effect based on the selected playback position, such that when played back at the AR device of the message recipient, the audio of the enhanced voice note sounds as if it is coming from the selected playback position.

18. The mobile device of claim 10, wherein the operations further comprise:

receiving a user selection of an object as the spatial destination for the enhanced voice note;

wherein packaging the enhanced voice note further comprises including object identification information for the selected object;

wherein the information reflecting the spatial destination comprises the object identification information; and wherein the object identification information enables the AR device to present the visual representation of the enhanced voice note anchored to the selected object only after detecting and tracking the selected object in the AR space.

19. A system for creating an enhanced voice note for transmission to an augmented reality (AR) device, the system comprising:

means for receiving a user input to initiate recording of a voice note;

means for activating a front-facing camera and at least one microphone to capture video of the face of a user and corresponding audio in response to receiving the user input;

means for processing the video by applying a computer vision segmentation process to isolate a region around the mouth of the user;

means for generating a visual representation of the voice note by extracting the isolated mouth region from the video;

means for receiving a user selection of a spatial destination for playing back the enhanced voice note via the AR device of a message recipient;

means for applying one or more enhancements to the recorded audio, wherein at least one of the one or more enhancements comprises processing the audio to reflect the selection of the spatial destination for playback;

means for packaging the enhanced audio, the visual representation, and information reflecting the spatial destination to generate the enhanced voice note, wherein the information reflecting the spatial destination is for use in positioning the visual representation of the enhanced voice note in AR space relative to an orientation of the AR device of the message recipient; and means for transmitting the voice note message for communication to the AR device of the message recipient.

20. The system of claim 19, further comprising:

means for displaying a user interface comprising a visual depiction of a person wearing an AR device;

means for receiving a user selection of a playback position for the visual representation of the enhanced voice note, wherein the user selection is made by interacting with the visual depiction of the person wearing the AR device;

wherein the information reflecting the spatial destination further comprises data indicating the selected playback position; and wherein the means for applying one or more enhancements to the recorded audio comprises means for processing the audio to create a spatial audio effect based on the selected playback position, such that when played back at the AR device of the message recipient, the audio of the enhanced voice note sounds as if it is coming from the selected playback position.

* * * * *